(12) United States Patent
Omid-Zohoor et al.

(10) Patent No.: US 11,977,095 B2
(45) Date of Patent: May 7, 2024

(54) METHOD AND SYSTEM FOR ANALYZING AN ATHLETIC THROWING MOTION BY AN INDIVIDUAL

(71) Applicant: PG Tech, LLC, Scottsdale, AZ (US)

(72) Inventors: Alex B. Omid-Zohoor, Scottsdale, AZ (US); Zac Zoller, Scottsdale, AZ (US); Erik Herter, Scottsdale, AZ (US)

(73) Assignee: PG Tech, LLC, Scottsdale, AZ (US)

( * ) Notice: Subject to any disclaimer, the term of this patent is extended or adjusted under 35 U.S.C. 154(b) by 256 days.

(21) Appl. No.: 17/192,727

(22) Filed: Mar. 4, 2021

(65) Prior Publication Data

US 2021/0275892 A1 Sep. 9, 2021

Related U.S. Application Data

(60) Provisional application No. 62/985,723, filed on Mar. 5, 2020.

(51) Int. Cl.
*G01P 15/18* (2013.01)
*A63B 24/00* (2006.01)
(Continued)

(52) U.S. Cl.
CPC .......... *G01P 15/18* (2013.01); *A63B 24/0006* (2013.01); *A63B 69/0002* (2013.01); *A63B 71/0622* (2013.01); *G01P 3/44* (2013.01); *G01P 13/00* (2013.01); *A63B 2024/0012* (2013.01); *A63B 2069/0006* (2013.01); *A63B 2071/0625* (2013.01); *A63B 2071/0647* (2013.01); *A63B 2071/0655* (2013.01); *A63B 2071/0694* (2013.01); *A63B 2102/18* (2015.10); *A63B 2220/34* (2013.01); *A63B 2220/40* (2013.01); *A63B 2220/806* (2013.01); *A63B 2220/808* (2013.01); *A63B 2220/836* (2013.01); *A63B 2225/02* (2013.01); *A63B 2225/50* (2013.01); *A63B 2225/74* (2020.08)

(58) Field of Classification Search
CPC .. G01P 15/18; A63B 24/0006; A63B 69/0002
See application file for complete search history.

(56) References Cited

U.S. PATENT DOCUMENTS 4,137,566 A 1/1979 Haas et al.
4,163,941 A 8/1979 Linn, Jr.
(Continued)

*Primary Examiner* — Alvin A Hunter
*Assistant Examiner* — Christopher Glenn
(74) *Attorney, Agent, or Firm* — Dentons US LLP

(57) ABSTRACT

Disclosed is a method for analyzing an athletic throwing motion by an individual. The method is executed by a motion monitoring system having at least one computer and at least one inertial sensor for sensing movement of the individual. The method involves the at least one computer receiving inertial sensor data from the at least one inertial sensor during execution of the athletic throwing motion by the individual, analyzing the athletic throwing motion by determining at least one metric from the inertial sensor data, and generating constructive feedback regarding the athletic throwing motion based on the at least one metric. The constructive feedback can for example be biofeedback and/ or a prescription for a set of exercises. The constructive feedback can help the individual improve upon the athletic throwing motion. Also disclosed is a motion monitoring system.

18 Claims, 11 Drawing Sheets

(51) Int. Cl.
*A63B 69/00* (2006.01)
*A63B 71/06* (2006.01)
*A63B 102/18* (2015.01)
*G01P 3/44* (2006.01)
*G01P 13/00* (2006.01)

(56) References Cited

U.S. PATENT DOCUMENTS

| | | |
|---|---|---|
| 4,337,049 A | 6/1982 | Connelly |
| 4,375,674 A | 3/1983 | Thornton |
| 4,631,676 A | 12/1986 | Pugh |
| 4,656,507 A | 4/1987 | Greaves et al. |
| 4,713,686 A | 12/1987 | Ozaki et al. |
| 4,828,500 A | 5/1989 | Seidel et al. |
| 4,860,096 A | 8/1989 | Long et al. |
| 5,072,294 A | 12/1991 | Engle |
| 5,111,410 A | 5/1992 | Nakayama et al. |
| 5,114,410 A | 5/1992 | Caralt Batlle |
| 5,184,295 A | 2/1993 | Mann |
| 5,221,088 A | 6/1993 | McTeigue et al. |
| 5,233,544 A | 8/1993 | Kobayashi |
| 5,342,054 A | 8/1994 | Chang et al. |
| 5,372,365 A | 12/1994 | McTeigue et al. |
| 5,419,562 A | 5/1995 | Cromarty |
| 5,459,793 A | 10/1995 | Naoi et al. |
| 5,486,001 A | 1/1996 | Baker |
| 5,501,463 A | 3/1996 | Gobush et al. |
| 5,553,846 A | 9/1996 | Frye et al. |
| 5,575,719 A | 11/1996 | Gobush et al. |
| 5,592,401 A | 1/1997 | Kramer |
| 5,697,791 A | 12/1997 | Nashner et al. |
| 5,772,522 A | 6/1998 | Nesbit et al. |
| 5,823,878 A | 10/1998 | Welch |
| 5,826,578 A | 10/1998 | Curchod |
| 5,864,960 A | 2/1999 | DeNicolo et al. |
| 5,904,484 A | 5/1999 | Burns |
| 5,907,819 A | 5/1999 | Johnson |
| 5,930,741 A | 7/1999 | Kramer |
| 5,935,014 A | 8/1999 | Lindsay |
| 5,984,810 A | 11/1999 | Frye et al. |
| 6,041,651 A | 3/2000 | Naruo et al. |
| 6,068,559 A | 5/2000 | Lubell et al. |
| 6,154,771 A | 11/2000 | Rangan et al. |
| 6,261,189 B1 | 7/2001 | Saville et al. |
| 6,293,802 B1 | 9/2001 | Ahlgren |
| 6,322,455 B1 | 11/2001 | Howey |
| 6,353,447 B1 | 3/2002 | Truluck et al. |
| 6,436,058 B1 | 8/2002 | Krahner et al. |
| 6,503,086 B1 | 1/2003 | Golubov |
| 6,514,081 B1 | 2/2003 | Mengoli |
| 6,537,076 B2 | 3/2003 | McNitt et al. |
| 6,567,536 B2 | 5/2003 | McNitt et al. |
| 6,587,809 B2 | 7/2003 | Majoe |
| 6,782,118 B2 | 8/2004 | Verga |
| 6,793,585 B1 | 9/2004 | Miyamoto et al. |
| 6,966,843 B2 | 11/2005 | Rankin et al. |
| 7,041,014 B2 | 5/2006 | Wright et al. |
| 7,074,168 B1 | 7/2006 | Farnes et al. |
| 7,101,287 B1 | 9/2006 | Wagner |
| 7,131,910 B2 | 11/2006 | Townsend, II |
| 7,465,257 B1 | 12/2008 | Morgan, Jr. |
| 7,503,878 B1 | 3/2009 | Amsbury et al. |
| 7,587,065 B2 | 9/2009 | Matsumoto et al. |
| 7,625,316 B1 | 12/2009 | Amsbury et al. |
| 7,658,695 B1 | 2/2010 | Amsbury et al. |
| 7,857,708 B2 | 12/2010 | Ueda et al. |
| 7,887,440 B2 | 2/2011 | Wright et al. |
| 9,311,789 B1 | 4/2016 | Gwin |
| 9,675,875 B2 | 6/2017 | Dugan |
| 2002/0064764 A1 | 5/2002 | Fishman et al. |
| 2003/0095186 A1 | 5/2003 | Aman et al. |
| 2005/0085311 A1 | 4/2005 | Voges et al. |
| 2005/0223799 A1 | 10/2005 | Murphy |
| 2005/0261073 A1 | 11/2005 | Farrington, Jr. et al. |
| 2005/0272561 A1 | 12/2005 | Cammerata |
| 2006/0094570 A1 | 5/2006 | Schneider |
| 2006/0166737 A1 | 7/2006 | Bentley |
| 2006/0247070 A1 | 11/2006 | Funk et al. |
| 2007/0172797 A1 | 7/2007 | Hada et al. |
| 2007/0249470 A1 | 10/2007 | Niva et al. |
| 2007/0270214 A1 | 11/2007 | Bentley |
| 2007/0298896 A1 | 12/2007 | Nusbaum et al. |
| 2009/0312152 A1 | 12/2009 | Kord |
| 2010/0033303 A1 | 2/2010 | Dugan et al. |
| 2010/0317489 A1 | 12/2010 | Flaction |
| 2010/0323805 A1 | 12/2010 | Kamino et al. |
| 2011/0046519 A1 | 2/2011 | Raheman |
| 2011/0251021 A1 | 10/2011 | Zavadsky et al. |
| 2012/0119911 A1 | 5/2012 | Jeon et al. |
| 2012/0183940 A1 | 7/2012 | Aragones et al. |
| 2013/0029791 A1* | 1/2013 | Rose ............... G09B 19/0038 473/409 |
| 2013/0032634 A1 | 2/2013 | McKirdy |
| 2013/0196822 A1 | 8/2013 | Watterson et al. |
| 2013/0211858 A1 | 8/2013 | Ohnemus et al. |
| 2013/0236867 A1 | 9/2013 | Avni et al. |
| 2013/0244211 A1 | 9/2013 | Dowling et al. |
| 2014/0073486 A1 | 3/2014 | Ahmed et al. |
| 2014/0081661 A1 | 3/2014 | Fu et al. |
| 2014/0135592 A1 | 5/2014 | Ohnemus et al. |
| 2014/0135593 A1 | 5/2014 | Jayalth et al. |
| 2014/0156040 A1 | 6/2014 | Mooney |
| 2014/0156308 A1 | 6/2014 | Ohnemus et al. |
| 2014/0180451 A1 | 6/2014 | Marty |
| 2014/0336947 A1 | 11/2014 | Walke et al. |
| 2015/0025419 A1 | 1/2015 | Aaberg |
| 2015/0133748 A1 | 5/2015 | Edmonds et al. |
| 2015/0148619 A1 | 5/2015 | Berg et al. |
| 2015/0230719 A1 | 8/2015 | Berg et al. |
| 2015/0251074 A1 | 9/2015 | Ahmed et al. |
| 2015/0302162 A1 | 10/2015 | Hughes et al. |
| 2016/0027325 A1 | 1/2016 | Malhotra |
| 2016/0038083 A1 | 2/2016 | Ding et al. |
| 2016/0058335 A1 | 3/2016 | Ashby |
| 2016/0114213 A1 | 4/2016 | Lee |
| 2017/0273601 A1 | 9/2017 | Wang et al. |
| 2018/0140902 A1 | 5/2018 | Wiebe et al. |
| 2018/0279916 A1 | 10/2018 | Folland et al. |
| 2019/0209909 A1* | 7/2019 | Thornbrue ......... A63B 69/3635 |
| 2019/0224528 A1* | 7/2019 | Omid-Zohoor ...... A61B 5/6806 |
| 2019/0258905 A1* | 8/2019 | Rankin ............. A63B 69/0002 |
| 2019/0374161 A1 | 12/2019 | Ly et al. |

\* cited by examiner

METHOD AND SYSTEM FOR ANALYZING AN ATHLETIC THROWING MOTION BY AN INDIVIDUAL

RELATED APPLICATION

This patent application claims priority to U.S. Provisional Patent Application No. 62/985,723 filed on Mar. 5, 2020, the entire disclosure of which is incorporated by reference.

FIELD OF THE DISCLOSURE

This disclosure relates to human motion monitoring systems, and more particularly to a motion monitoring system for analyzing an athletic throwing motion by an individual.

BACKGROUND

In baseball, a pitcher is a player who throws a baseball from a pitchers mound toward a catcher to begin each play, with a goal of retiring a batter, who attempts to either make contact with the ball or draw a walk. The pitcher is often considered to be a very important player in baseball. Therefore, improving the performance of the pitcher is of great interest. Coaching can help, but can be limited in terms of its effectiveness and by its subjectivity. Other sports can involve similar athletic throwing or arm motions, such tennis, football, cricket, and track and field sports like javelin, hammer throw, and shot put to name a few. Coaching can help improve performance, but it remains limited in terms of its effectiveness and by its subjectivity.

Proper pitching mechanics are critical for the effectiveness, longevity and safety of a baseball pitcher at any level. Poor mechanics may lead to increased stress on the elbow or shoulder and can increase the risk of injury. Proper pitching biomechanics use proper motions and forces on all body parts in an optimal sequence, often referred to as the kinetic chain. The kinetic chain in pitching is an interaction of body segments, each upon the other, in a sequential pattern from the ground up. Accurate pitching with force or speed requires the entire body and not just the shoulder and arm. Every part of the musculoskeletal system is involved. If any of these movements "break down," they can make the ball go somewhere that it is not intended to go.

There are few differences between the biomechanics of successful youth and adolescent pitchers and the mechanics of successful collegiate and professional pitchers. The major difference is that younger pitchers generally generate less joint force and torque, and young pitchers are less consistent from pitch to pitch. While each pitcher is different and can display individuality in his or her mechanics, everyone has similar anatomy (e.g., muscles, bones and ligaments in the same locations) and is throwing following the same laws of physics (e.g., force=mass×acceleration, etc.). Thus, there are common traits among healthy, successful pitchers.

There are generally five phases of throwing mechanics which contribute to a throwing signature. Phase 1 is the wind up phase. The entire motion of throwing a ball takes approximately 2 seconds to complete and the wind up consumes nearly 1.5 seconds of that time. At this phase, motion occurs in the lower extremities and torso, which is where the vast majority of power to throw a ball is generated. Phase 2 is the cocking phase, which prepares the arm to be able to throw the ball. At this phase, the posterior shoulder musculature is active and the position of the shoulder is in extreme external rotation. The body begins to move forward towards its target during this phase. The lead shoulder is directed at the target and the throwing arm continues to move into extreme external rotation. Phase 3 is the acceleration phase. At this phrase, the throwing arm moves forward to actually throw the ball. The arm moves from an extreme external rotation to internal rotation. Proper body mechanics place the shoulder in the proper position during the acceleration phase to generate sufficient velocity and accuracy without causing an injury to the throwing shoulder. The end of this phase is marked by the release of the ball out of the pitcher's hand. Phase 4 is the deceleration phase. At this phrase, when the ball is released, the posterior quadrant musculature begins to contract eccentrically to slow down and control the rotational speed of the humeral head (ball in the shoulder ball-and-socket joint). Injuries to the throwing shoulder can occur during this phase. The amount of eccentric contractile force that occurs can damage the posterior musculature. Phase 5 is the follow-through phase. At this phase, all body motions are slowed down and forward movement of the body is stopped.

Throwing a ball over-hand, e.g., pitching, involves all parts of the body. If the mechanics are performed properly, the ball can be thrown with sufficient velocity and accuracy. If the body is trained correctly, the act of throwing can be performed repetitively without causing an injury to the throwing shoulder.

Every player has their throwing signature influenced by many factors. These factors may be age, physical development, experience, mobility, flexibility, stability, and intellect to name a few. The naked eye is incapable of identifying nuance throughout the delivery in real time. Because the human eye is only capable of seeing a limited number of frames per second, existing technology generally relies on high-speed video capture to provide the objective measures. There is no doubt that high-speed video can be helpful and interesting to both athletes and coaches. However, video runs into the same issues as still pictures. For example, you cannot get torque measurements from one camera video, inability to measure rotation, a one camera view video cannot inform velocity of hip, torso, or arm rotation, etc. This is the obvious issue in baseball because it is highly rotational and involves all three planes of motion.

Moreover, via pictures or video, coaches and players need to be aware that some things they think players are getting better or worse at, could be different because of measurement error. While video and pictures can be useful, there is a difference between looking at a players movement and trying to measure biomechanics. If video is used to assess players mechanics, then the camera must be at the same angle and distance every time. Importantly, if you are going to compare video of a pitcher from multiple bullpens or locations, the video needs to be taken from the exact same spot. When videos are being compared from different angles, the possibility of creating issues that aren't there increases. In other words, changes that you think you see in a pitchers mechanics could be coming from a different camera angle and not a movement change. This is known as a parallax error, which is the apparent displacement of an observed object due to a change in the position of the observer. Moreover, while comparing videos over time can give a better understanding of how a player's movement has changed, it cannot show how forces have changed. Thus, many such measurements are riddled with error and/or ignored.

The ability to accurately monitor position and movement profiles of a player is critical in developing improved training regimens to maximize individual performance. Hence, improving measurement accuracy is crucial to measure and appropriately tailor workout regiments for athletes. Biomechanical testing of pitchers in its current state is subject to inaccuracy and cumbersome to perform. For at least the foregoing reasons, it is an object of the invention to provide an improved method and system for accurately measuring, assessing, and/or training an athletic throwing motion.

SUMMARY OF THE DISCLOSURE

Disclosed is a method for analyzing an athletic throwing motion by an individual. The method is executed by a motion monitoring system having at least one computer and at least one inertial sensor for sensing movement of the individual. The method involves the at least one computer receiving inertial sensor data from the at least one inertial sensor during execution of the athletic throwing motion by the individual, analyzing the athletic throwing motion by determining at least one metric from the inertial sensor data, and generating constructive feedback regarding the athletic throwing motion based on the at least one metric.

The constructive feedback can for example be biofeedback and/or a prescription for a set of exercises. The constructive feedback can help the individual improve upon the athletic throwing motion. The constructive feedback is based on objective calculations using data that has been acquired, and hence is not subjective in the way that coaching is subjective. Therefore, the method can be an improvement over conventional approaches that use coaching.

Also disclosed is a motion monitoring system. The motion monitoring system has at least one inertial sensor configured for sensing movement of an individual during an athletic throwing motion. The motion monitoring system also has at least one computer having motion monitoring circuitry configured for receiving inertial sensor data from the at least one inertial sensor during execution of the athletic throwing motion by the individual, analyzing the athletic throwing motion by determining at least one metric from the inertial sensor data, and generating constructive feedback regarding the athletic throwing motion based on the at least one metric.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Introduction & Methodology

Figure 1:
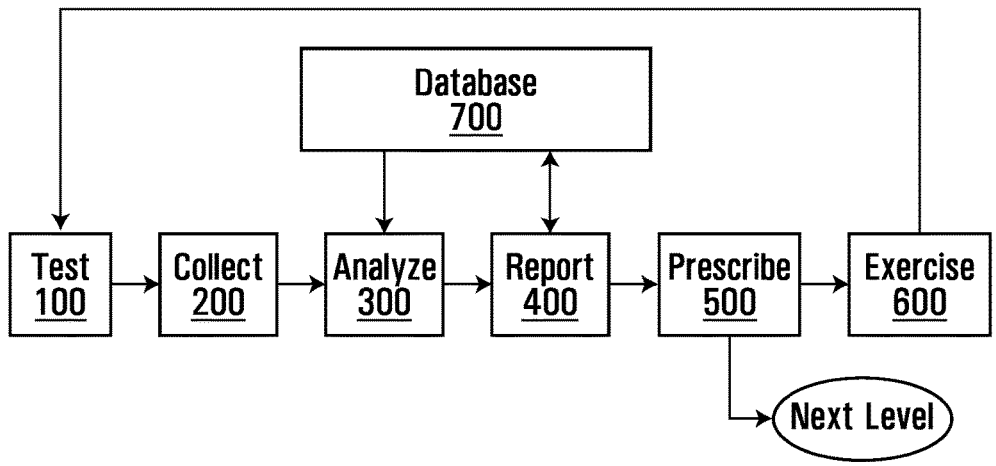
FIG. 1 is a flow chart of an example methodology in which constructive feedback is provided to a subject performing an athletic throwing motion.

Referring first to FIG. 1, shown is a flow chart of an example methodology in which constructive feedback is provided to a subject performing an athletic throwing motion. Steps of the flow chart are described below in sequence. It is noted that additional steps may be present but are not shown for simplicity. It is also noted that the "athletic throwing motion" generally refers to pitching performed by a baseball pitcher, but can also include other athletic throwing motions such as throwing a dodgeball for example.

Test 100 involves a user to subject themselves to testing by use of a system while they perform an athletic throwing motion. Collect 200 includes measurement and collection of motion data with inertial sensors, a camera, and/or possibly other sensors, of the athletic throwing motion executed during the test. Analyze 300 includes analyzing the collected data, and includes accessing a database 700 of related data for comparison and for relating types and degrees of deviations in performance from benchmark values to a library of standard exercises, with a view to generating constructive feedback such as prescriptions of appropriate practice exercises or corrective measures.

In some implementations, report 400 includes generation of a unique display of synchronized video, motion animation and data/time graphs. In some implementations, prescribe 500 includes documentation and delivery of a program or regime of type and time or quantity of performance parameter-specific exercises. In some implementations, exercise 600 instructs the user to practice the exercises or corrective measures in accordance with the prescription. More generally, the combination of the report 400, the prescribe 500, and the exercise 600 provides constructive feedback for the subject.

In some implementations, a cycle through the test 100, the collect 100, the analyze 300, the report 400, the prescribe 500 and the exercise 600 can be repeated as often as desired until a desired level of performance or improvement is achieved. For example, a type, time and level of the prescribed exercises can be adjusted automatically (up or down) according to a most recent performance and/or a change in performance between the most recent performance test and prior reported test results. More generally, the combination of the report 400, the prescribe 500, and the exercise 600 can be adjusted automatically so that the constructive feedback for the subject is automatically adjusted with a view to improving the athletic throwing motion. It is noted that, although improving performance is desired and would be a typical outcome of the methodology, it is possible that some subjects might not actually achieve an improvement.

The methodology can be used to measure, assess, and/or train an athletic throwing motion according to at least the exemplary embodiments described below. The exemplary embodiments disclosed herein include various algorithms that can be used by a motion analysis system to determine key points of an athletic throwing motion. In some implementations, these key points can be used by the motion analysis system to determine when the athletic throwing motion occurred as well provide a snapshot of the mechanics involved for an efficient throwing motion. In some implementations, these fundamental points can allow the motion analysis system to correlate data from different throwing motions to determine overall trends and to track progress as a user gets more or less efficient throughout their use of the motion analysis system. Such use could include one session or many sessions, thereby giving the user a sense of progress quantified over time as little as minutes or as large as years. In some implementations, key points to determine the athletic throwing motion can include Max Load frame, Peak Pelvis Speed frame, MER (Max External Rotation) frame, and Ball Release frame, which are described below.

The methodology can be implemented using any suitable motion analysis system. There are many possibilities for the motion analysis system. In some implementations, the motion analysis is locally-deployed. An example of this will be described below with reference to FIG. 2. In other implementations, the motion analysis is cloud-based system. An example of this will be described below with reference to FIG. 3.

Motion Analysis System

Figure 2:
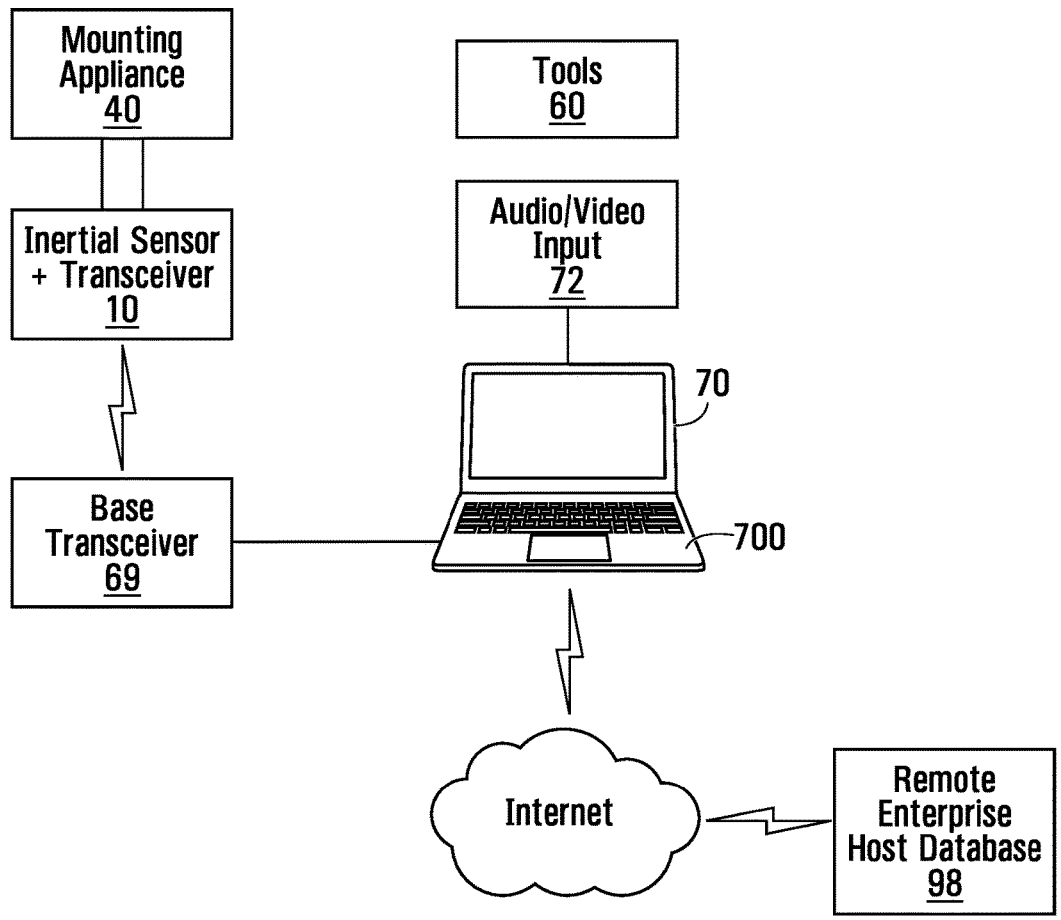
FIG. 2 is a block diagram of a block diagram of an example motion analysis system that is a locally-deployed.

Referring now to FIG. 2, shown is a block diagram of a motion analysis system 73. The motion analysis system 73 has inertial sensors 10, audio/video sensors 72, a base transceiver 69, and a computer 70 with its control/display unit and an internet connection to an enterprise host and database 98. In some implementations, the inertial sensors 10 are attached to a user via mounting appliances 40 that are worn by the user. The inertial sensors 10 communicate by wireless means with the base transceiver 69, which is coupled to or integrated into the computer 70. The audio/video sensors 72 can for example include one or more video cameras and optionally a microphone and other sensors. The audio/video sensors 72 are connected to the computer 70 by wire or wireless means. The motion analysis system 73 may have additional components that are not shown.

The computer 70 has control and display capabilities. In some implementations, the computer 70 is a laptop computer with suitable application software and an onboard or connected database 700. However, other implementations include tablet computers, mobile phones and desktop computers, to name a few. The computer 70 processes motion data and generates, displays and/or transmits reports and prescriptions as described in more detail below. Training tools 60 are not directly linked to the computer 70 or other associated components, but may be used by the user during practice exercises as prescribed by the system after testing and analysis, such exercises focused on particular body segments and components of the motion being monitored (e.g., throwing motion). The training tools 60 may include, for example, resistance bands, sports J-bands, weighted training baseballs, etc.

The computer 70 and its related components may be operated at times on a standalone basis, but may always or at times be connected or connectable to a remote, knowledge-based enterprise system and database 98 via a browser-based internet access point or other high speed data connection for conducting data transfer and enterprise related activities between the host and local systems. For example, a website for the enterprise system and host database 98 may provide access for registered user systems 70 to the host company's information, motion analysis products and services information, management information, company news, user access via a login screen for product and service FAQs, newsletters, and database 700 libraries of past performance and benchmark data and exercises, and updates thereof.

In some implementations, the motion analysis system 73 operates with standalone configurations as individual test and evaluation systems for collecting student performance data, analyzing and comparing student data to a library of performance data including expert performance data, reporting the results, and prescribing corrective exercises. New test results are added to the database, and may be delivered to or accessed by coaches and/or students via online access to internet services. Individual systems may share access to a host database of test results of other users and related practice drills for study or comparative purposes.

Constructive feedback can be generated by the computer 70 and displayed by the computer 70. In other implementations, the constructive feedback is provided to another display or recipient device that is configured to convey the constructive feedback to the user. The constructive feedback can for example include biofeedback in a form that differs between a successful athletic throwing motion and an unsuccessful athletic throwing motion (or components thereof) and/or identifying a set of exercises for the individual to perform related to the athletic throwing motion.

Figure 3:
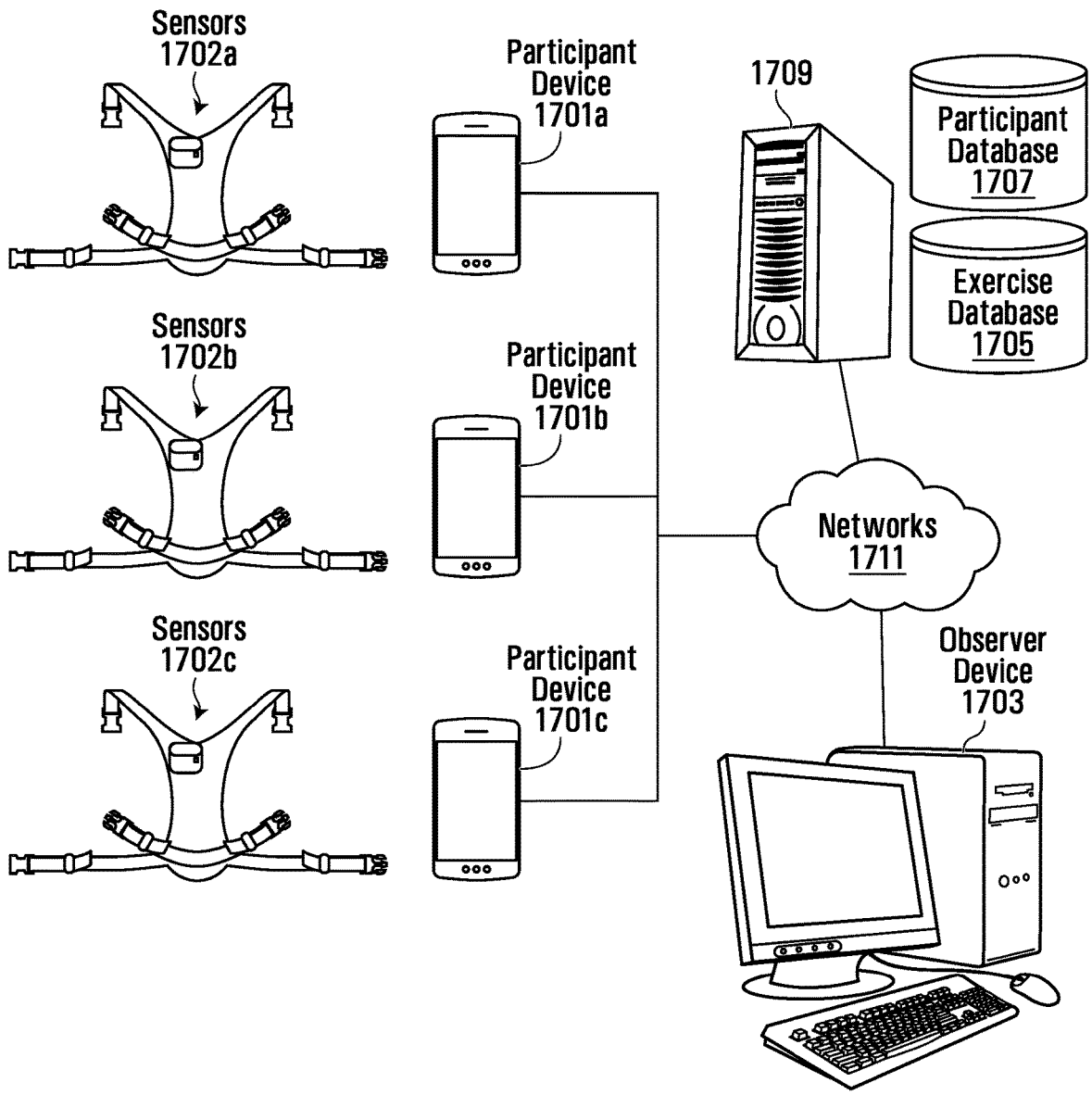
FIG. 3 is a block diagram of another example motion analysis system featuring a cloud-based implementation.

Referring now to FIG. 3, shown is a block diagram of another motion analysis system 74 featuring a cloud-based implementation. The motion analysis system 74 has participant devices 1701a-c coupled to corresponding sensors 1702a-c, an one or more observer devices 1703, one or more databases 1707,1705, one or more servers 1709, and one or more networks 1711. The motion analysis system 74 can support multiple participant devices 1701a-c, for example three participant devices 1701a-c as shown in this example, although it is to be understood that there can be less or more participant devices than that shown. The one or more databases 1707,1705 can for example include an exercise database 1705 and a participant database 1707. Additionally, or alternatively, there can be an observer database (not shown) and a motion database (not shown). The motion analysis system 74 may have additional components that are not shown.

The participant devices 1701a-c can monitor and capture sensor data received from the sensors 1702a-c, and communicate various types of data and instructions to and from devices of the motion analysis system 74, such as the server 1709 and the observer devices 1703. Each participant device 1701a-c can be any computing device having hardware and software components capable of performing various tasks and processes described herein. Non-limiting examples can include laptop computers, desktop computers, smartphones, tablets, wearable devices (e.g., smart watches smart glasses, AR headsets, VR headsets, etc.), and the like.

Each participant device 1701*a-c* can include a communications component configured to facilitate wired or wireless data communications between a set of one or more sensors 1702*a-c* and the participant device 1701*a-c*. The communications component can include one or more circuits, such as processors and antennas, for communicating sensor data via a communications signal using an associated wired or wireless communications protocol. For example, the communications component of the participant device 1701*a-c* may include, for instance, a Bluetooth® or ZigBee® chip that may be configured to monitor and receive sensor data from the set of one or more sensors 1702 associated with the participant device 1701, via the requisite Bluetooth® or ZigBee® protocols. Other non-limiting examples of the communications component and associated protocols may include: a NIC (Network Interface Card) for LAN (Local Area Network) or Wi-Fi communications, a NFC (Near Field Communications) chip, and the like.

Constructive feedback can be transmitted from the observer device 1703 and/or server 1709 to a user interface presented in the participant device 1701*a-c*, or another display or recipient device that is configured to convey feedback to the user. For example, the server 1709 (or observer device 1703) may be configured to generate different graphical user interfaces and display them on different computing devices described herein. The constructive feedback can for example include biofeedback in a form that differs between a successful athletic throwing motion and an unsuccessful athletic throwing motion and/or identifying a set of exercises for the individual to perform related to the athletic throwing motion.

The server 1709 hosting the databases may comprise a processor and non-transitory machine-readable storage media comprising a set of instructions allowing the various databases to perform various tasks and processes described herein, such as to display various graphical user interfaces. Each instruction within the set of instructions may command and cause a different module of the server 1709 or processors to display a particular section or container of the graphical user interfaces described below. For example, a first instruction may instruct (e.g., command or cause) a first module of the server 1709 to query pertinent data from the exercise database 1705 or the participant database 1707, and display a first section of a graphical user interface; and a second instruction may instruct a second module of the server 1709 to query pertinent data from a different database and display a second section of the graphical user interface. Although described herein as separate modules, it is intended that these modules can be configured as at least one module. Moreover, the server 1709 may be a database server comprising a processor capable of performing the various tasks and processes described herein. Non-limiting examples may include a server, desktop, laptop, tablet, and the like. The server 1709 may host an online service, such as cloud-computing application service, or any other service that provide web-based applications that collect data through web-based client interactions over one or more networks such as network 1711. Accordingly, the server 1709 may generate and display different graphical user interfaces on different computing devices described herein.

According to another embodiment, for example, the one or more servers 1709 include an analytics engine that further includes a data extraction module and data processing module. The analytics engine can be a software component stored on a computer readable medium and executed by a processor, e.g., as specially programmed software on a server (referred to and used interchangeably as an analytics engine server). The analytics engine can be configured to receive user input from one or more participant devices 1701*a-c* and/or one or more observer devices 1703, receive data from a database (e.g., exercise database 1705, participant database 1707, observer database, motion database, etc.), produce solution data from the received user input and data, and provide the produced solution data to one or more participant devices 1701*a-c* and/or one or more observer devices 1703. Thus, for example, a user may request a report, such as an Evaluation Report, regarding the status of a particular training program, and the analytics engine may generate and present the report on different computing devices described herein.

In some embodiments, the analytics engine is implemented as a set of computer instructions executed by one or more servers 1709 that run computer executable program instructions or related algorithms.

According to another embodiment of the disclosure, there is provided a non-transitory computer readable medium having recorded thereon statements and instructions that, when executed by a processor, implement a method as described herein. The non-transitory computer readable medium can for example be a computer readable medium of the computer 70 shown in FIG. 2, a computer readable medium of the server 1709 shown in FIG. 3, a computer readable medium of the observer device 1703 shown in FIG. 3, or some other non-transitory computer readable medium. The non-transitory computer readable medium can for example include an SSD (Solid State Drive), a hard disk drive, a CD (Compact Disc), a DVD (Digital Video Disc), a BD (Blu-ray Disc), a memory stick, or any appropriate combination thereof.

The illustrated examples described herein focuses on software implementations in which software can be executed by a processor of the computer 70 shown in FIG. 2, a processor of the server 1709 shown in FIG. 3, a processor of the observer device 1703 shown in FIG. 3, or some other processor. However, other implementations are possible and are within the scope of this disclosure. It is noted that other implementations can include additional or alternative hardware components, such as any appropriately configured FPGA (Field-Programmable Gate Array), ASIC (Application-Specific Integrated Circuit), and/or microcontroller, for example. More generally, there is provided motion monitoring circuitry configured for implementing any method described herein, which can be implemented with any suitable combination of hardware, software and/or firmware.

Correct Sensor Placement

There are many possibilities for the sensors 1702*a-c* shown in FIG. 3. In some implementations, each set of sensors 1702*a-c* includes a set of inertial sensors, for example four inertial sensors, which can be mounted to an individual. An example of this is described below with reference to FIGS. 4A to 4C. However, it is noted that other implementations are possible for the sensors 1702*a-c* in which there may be more or less sensors, possibly of varying type, and possibly with varying mounting to the individual.

Figure 4A:
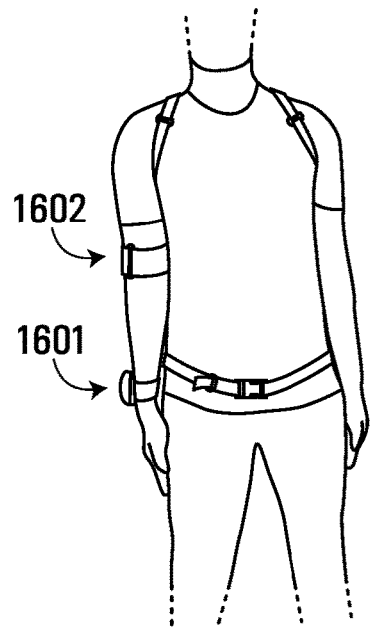
FIGS. 4A to 4C are schematics of a baseball pitcher with four inertial sensors mounted to their body.
Figure 4B:
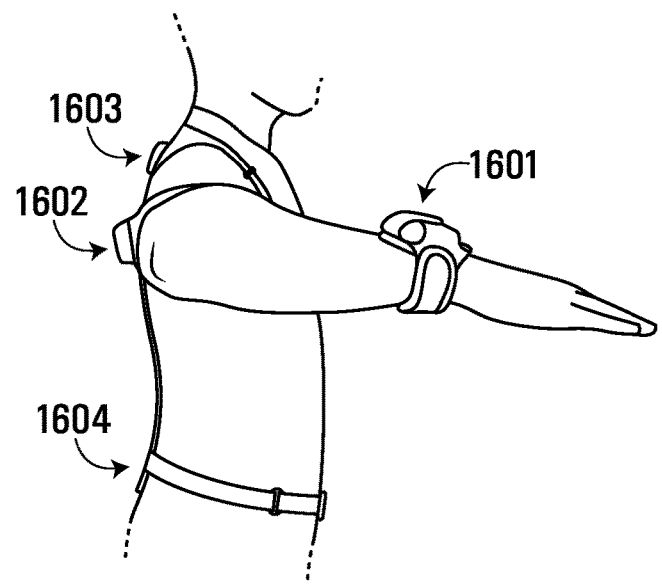
Figure 4C:
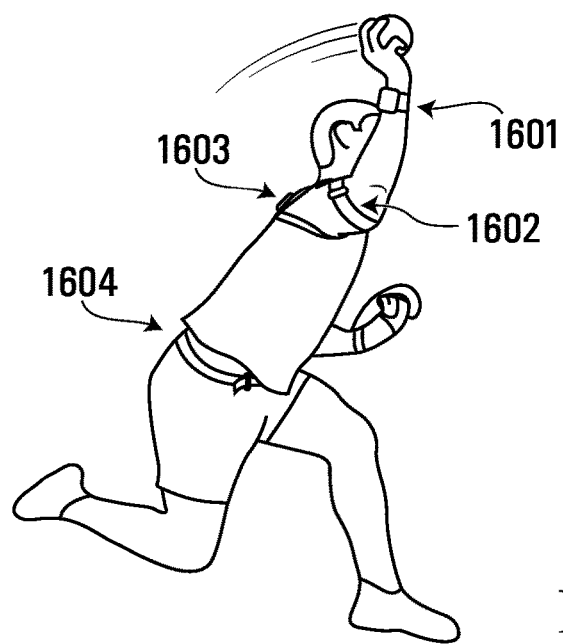

Referring now to FIGS. 4A to 4C, shown are schematics of a baseball pitcher with four inertial sensors 1601-1604 mounted to their body. FIGS. 4A and 4B show a front view (FIG. 4A) and a side view (FIG. 4B) of the person. FIG. 4C shows the person pitching a ball. The four inertial sensors 1601-1604 include a wrist sensor 1601, an upper arm sensor 1602, an upper torso sensor 1603, and a pelvis sensor 1604. The four inertial sensors 1601-1604 are preferably mounted as depicted in these Figures so that they may be used in connection with the athletic throwing motion algorithms described herein with the system 73 and/or the system 74. For example, the upper arm sensor 1602 is preferably placed on a back side of the upper arm as best shown in FIG. 4B. However, other implementations are possible with alternative sets of sensors and/or alternative sensor mountings.

Figure 5:
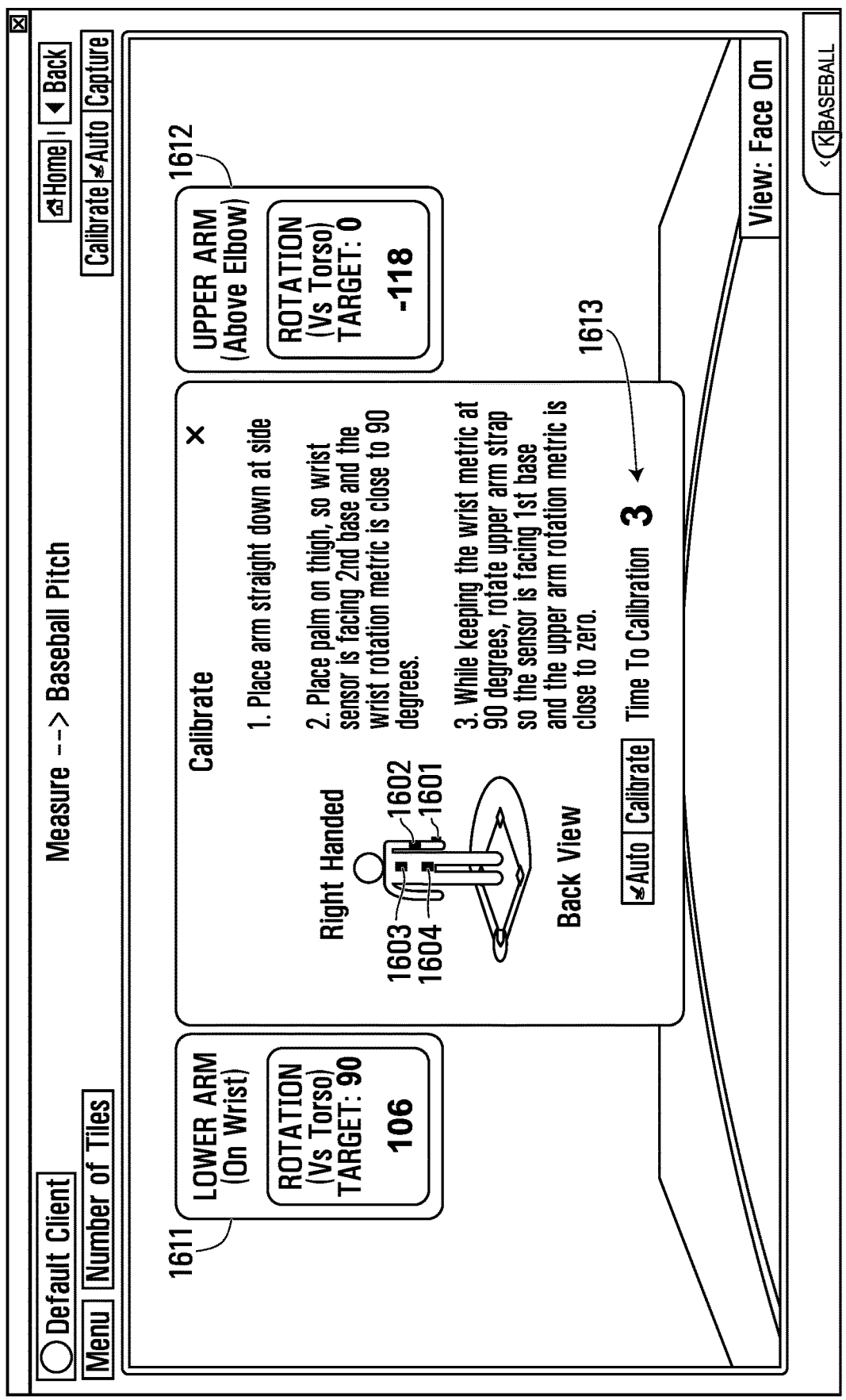
FIG. 5 is a schematic of an example GUI for calibrating sensor mountings.

In some implementations, the system 73 and/or the system 74 assists users to calibrate the sensor mountings to ensure that they are placed correctly. Referring now to FIG. 5, shown is a schematic of an example GUI for calibrating sensor mountings. In some implementations, the GUI is generated by the system 73 and/or the system 74 to help users to ensure that the wrist sensor 1601 and the upper arm sensor 1602 are placed correctly on the wrist and upper arm. Assistance with correctly placing the upper torso sensor 1603 and the pelvis sensor 1604 is also possible, although this is not depicted in FIG. 5.

In some implementations, the system 73 and/or the system 74 detects and displays in real-time rotations between the upper arm sensor 1602 and the wrist sensor 1602 relative to the torso. Box 1611 displays the rotation of the wrist sensor 1602 relative to the torso in real-time (rotation=106 in this example) underneath a target (target=90 in this example). Box 1612 similarly displays the rotation of the upper arm sensor 1602 relative to the torso in real-time (rotation=−118 in this example) underneath a target (target=0 in this example). A goal of the user is to make adjustments to sensor mountings as appropriate bring the rotations towards the targets. In some implementations, each rotation is displayed using green text when it is within a threshold value of the target and with red text when it is not within the threshold value of the target (not limited to any particular color). This provides constructive feedback for the user.

In some implementations, once each rotation is within its threshold value of its target, in addition to the rotation being displayed with green text, a Time To Calibration 1613 counts down from three seconds to zero seconds at which point calibration is applied (not limited to any particular time). However, if at any point during the countdown, if either of the sensor rotations relative to torso deviate from its target value by more than the threshold value, the sensor rotation will turn red again and the Time to Calibration 1613 will reset back to three seconds. This can ensure that when the system 73 and/or the system 74 applies calibration, the sensors are placed correctly on the upper arm and wrist.

Max Load Frame

Max load frame refers to when a user's body is at its peak load, prior to a throwing motion. This is part of a wind up of the throwing motion where the user is beginning motion and creating power that will drive the throwing motion.

In some implementations, with an athletic throwing motion, max load frame is determined based on an amount the pelvis is rotated in relation to a target, and determined when it is at its max, or rotated the most away from the target prior to the actual throwing motion. In some implementations, the system 73 and/or the system 74 reports rotations as both positive and negative: positive is when rotation of the pelvis is toward the target in respect to a neutral or calibration line and negative is when the pelvis is away from the target in relation to the neutral or calibration line. Therefore, the max load frame, or max pelvis rotation frame, occurs when this value is at its lowest negative value.

Figure 6:
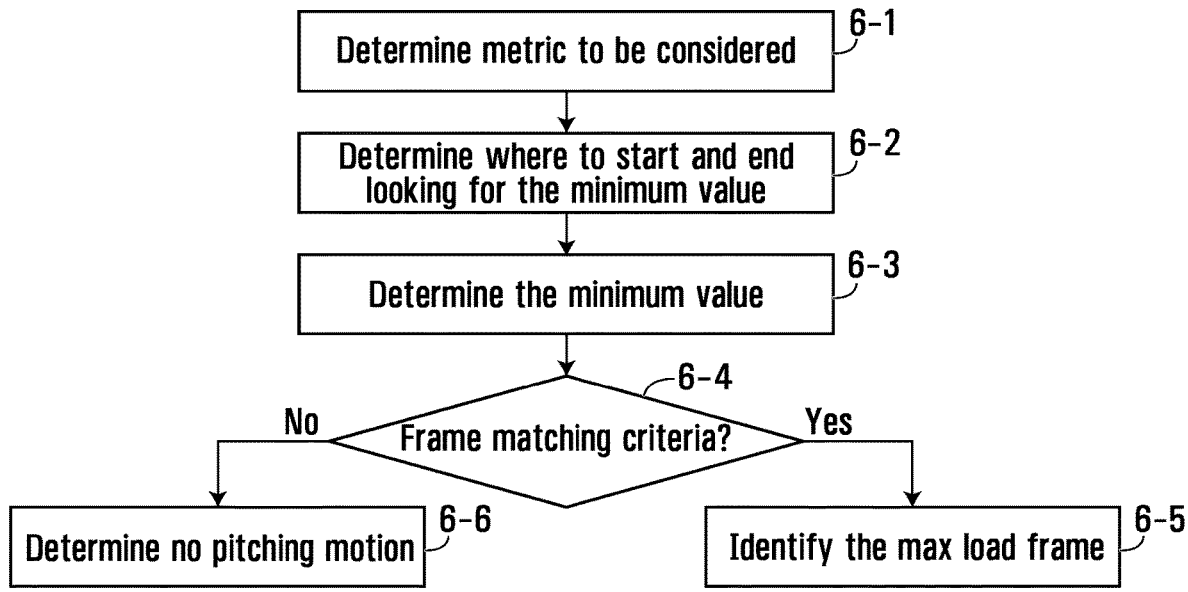
FIG. 6 is a flowchart of a method of determining max load frame of an athletic throwing motion.

Referring now to FIG. 6, shown is a flowchart of a method of determining max load frame of an athletic throwing motion. This method is described below in relation to the motion instruction system 74 shown in FIG. 3. The method can be executed by a computer, for example the server 1709 or the observer device 1703. However, it is to be understood that the method can be executed by other systems, for example the motion analysis system 73 of FIG. 2.

At step 6-1, the system 74 determines what metric to consider. In this example, the system 74 chooses a pelvis rotation, although other metrics could be selected. In some implementations, the metric to be considered is configurable by a user. In other implementations, the system 74 determines what metric to consider based on some defined criteria. In other implementations, the system 74 always chooses the pelvis rotation in which case there might not be any such determination step. The system 74 then looks for a lowest number or greatest negative rotation value between start and end frames as described below with for steps 6-2 and 6-3. These frames are captured by the inertial sensor(s) mounted to the individual. Each frame can for example include a set of inertial values from the wrist sensor 1601, the upper arm sensor 1602, the upper torso sensor 1603, and the pelvis sensor 1604.

At step 6-2, the system 74 determines where to start and end looking for the minimum value, within the inertial data captured. To do this, the system 74 can determine a starting point to the athletic throwing motion and find an appropriate ending point to the athletic throwing motion. In some implementations, the starting point can be determined by looking at when the arm starts to move backward, and the ending point can be determined by looking at when the ball was most likely released (see algorithm below).

At step 6-3, once the system 74 has the start and end points in time that occurred within a range of frames that has been captured, those frames are passed into a function that will find the minimum rotation within that range of frames and return a point when the pelvis was rotated furthest back in the athletic throwing motion. At each point in time checked, if the current value for pelvis rotation is lower than the current minimum stored value, then the current minimum stored value is set to the current value, and an associated point in time is updated to the current point in time being checked. In some implementations, the system 74 goes through all points between the start and end points.

If at step 6-4 the system 74 has found a frame that matches the criteria of a minimum metric value found at step 6-3 that is less than the metric value at the start frame, then at step 6-5 the system 74 identifies that frame as the max load frame of the athletic throwing motion. The time at which the max load frame is experienced can also be determined based on the frame. However, if at step 6-4 the system 74 has not found a frame that matches the criteria, then at step 6-6 the system 74 returns a sentinel value that indicates the motion being analyzed is not in a format that can be assessed or that the motion was not actually a pitching style motion.

In some implementations, the system 74 generates constructive feedback regarding the athletic throwing motion based on the max load frame. For example, if the rotation of the pelvis is 50 degrees at the max load frame, while elite pitchers rotate between 25 and 45 degrees at the max load frame, then constructive feedback can be generated to convey this difference (e.g. visual indication or other indication to show 50 degrees deviating out of a range of 25 to 45 degrees). Other possibilities exist for the constructive feedback and are within the scope of the disclosure.

Peak Pelvis Speed Frame

Peak Pelvis Speed frame refers to when a users pelvis reaches its max positive velocity during a throwing motion. The rotational velocity of the pelvis can be a key metric to calculate, because it can correlate as a valuable key motion event. The Peak Pelvis Speed frame normally occurs within a short time window of a pitchers foot plant (e.g., when a front foot makes solid contact with the ground).

Figure 7:
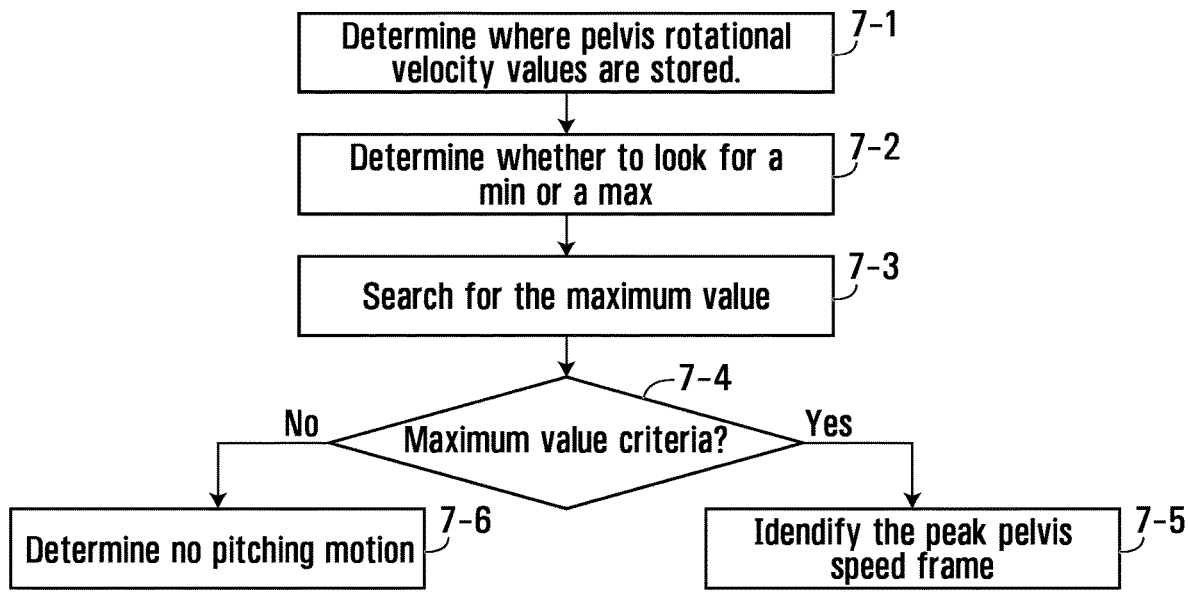
FIG. 7 is a flowchart of a method of determining peak pelvis speed frame of an athletic throwing motion.

Referring now to FIG. 7, shown is a flowchart of a method of determining Peak Pelvis Speed frame of an athletic throwing motion. This method is described below in relation to the motion instruction system 74 shown in FIG. 4. The method can be executed by a computer, for example the server 1709 or the observer device 1703. However, it is to be understood that the method can be executed by other systems, for example the motion analysis system 73 of FIG. 2.

At step 7-1, the system 74 determines where pelvis rotational velocity values are stored in an array of data. The pelvis rotational velocity values are stored after they have been calculated based on acquired data from the inertial sensor(s) mounted to the individual. In some implementations, rotational velocity is reported as positive or negative, and when positive the pelvis rotates from closed to open.

At step 7-2, the system 74 determines whether to look for a min or a max based on the algorithm. For Peak Pelvis Speed frame, the system 74 determines a max value. However, other implementations are possible in which the system 74 instead determines a min value.

At step 7-3, as the system 74 goes through each piece of data in the array, if that piece of data has a higher number than the already stored max value, then the system 74 updates the max value and the point in time in which the max value was found, until the entire motion is processed.

If at step 7-4 the system 74 finds a max value at the end of the function, then at step 7-5 the system 74 identifies the Peak Pelvis Speed frame as the frame at which the max value occurred. In some implementations, the system 74 stores the Peak Pelvis Speed frame and/or the max value. However, if at step 7-4 the maximum value found is not greater than the first pelvis rotational velocity value in the array, then at step 7-6 a sentinel value is returned from the function, telling the system 74 that the motion did not fit the pattern indicative of a throwing motion.

In some implementations, the system 74 generates constructive feedback regarding the athletic throwing motion based on the Peak Pelvis Speed frame. For example, if the pelvis speed at the Peak Pelvis Speed frame is 300 degrees per second, while elite pitchers have a pelvis speed at the Peak Pelvis Speed frame between 400 to 500 degrees per second, constructive feedback can be generated to convey this difference (e.g. visual indication or other indication to show 300 degrees per second deviating out of a range of 400 to 500 degrees per second). Other possibilities exist for the constructive feedback and are within the scope of the disclosure.

Max External Rotation frame

The arm cocking phase ends with the throwing shoulder in MER (maximum external rotation). In other words, the forearm is approximately perpendicular to the trunk and the palm of the hand is facing up. Achieving such external rotation is strongly related to ball velocity. An athlete must cock his or her arm back far in order to accelerate his or her hand forward. The MER frame is a point in time when the arm is furthest back, which is the point that marks a change in direction of the throwing motion. An anatomical representation of internal/external rotation is an anatomical metric which defines a relationship between two sensors as a quantifiable joint movement. It can be important to determine where in the throwing motion this key event takes place. The system 74 determines this by looking between the beginning of the throwing motion and the end of the throwing motion and finds where the external rotation is the highest. Once this point is found, it is returned as a key point in time of interest, allowing the system 74 to later retrieve any and all other relevant data associated with this point in time.

Figure 8:
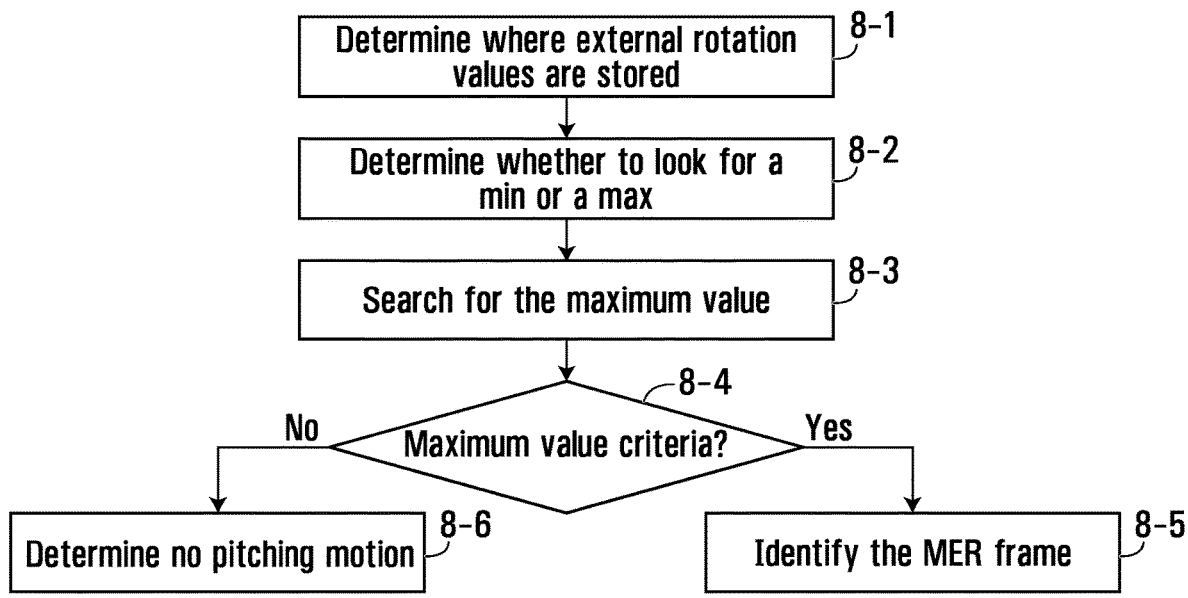
FIG. 8 is a flowchart of a method of determining MER frame of an athletic throwing motion.

Referring now to FIG. 8, shown is a flowchart of a method of determining MER frame of an athletic throwing motion. This method is described below in relation to the motion instruction system 74 shown in FIG. 4. The method can be executed by a computer, for example the server 1709 or the observer device 1703. However, it is to be understood that the method can be executed by other systems, for example the motion analysis system 73 of FIG. 2.

At step 8-1, the system 74 determines where external rotation values are stored in an array of data. The external rotation values are stored after they have been calculated based on acquired data from upper arm sensor 1602 and torso sensor 1603.

At step 8-2, the system 74 determines whether to look for a min or a max based on the algorithm. For MER frame, the system 74 determines a max value. However, other implementations are possible in which the system 74 determines a min value.

At step 8-3, as the system 74 goes through each piece of data in the array, if that piece of data has a higher number than the already stored max value, then the system 74 updates the max value and the point in time in which the max value was found, until the entire motion is processed.

If at step 8-4 the system 74 finds a max value at the end of the function, then at step 8-5 the system 74 identifies the MER frame as the frame at which the max value occurred. In some implementations, the system 74 stores the MER frame and/or the max value. However, if at step 8-4 the maximum value found is not greater than the first external rotation value in the array, then at step 8-6 a sentinel value is returned from the function, telling the system 74 that the motion did not fit the pattern indicative of a throwing motion.

In some implementations, the system 74 generates constructive feedback regarding the athletic throwing motion based on the MER frame. For example, if the external rotation at the MER frame is 130 degrees away from target, while elite pitchers achieve an external rotation at the MER frame of 150 degrees or greater, constructive feedback can be generated to convey this difference (e.g. visual indication or other indication to show 130 degrees away from target falling short of a range of 150 degrees or greater). Other possibilities exist for the constructive feedback and are within the scope of the disclosure.

Ball Release Frame

Ball Release frame refers to when a player/pitcher releases a ball at the end of a throwing motion prior to follow through. This is a key concept in pitching for data to have real world meaning/implications.

Inertial sensors such as the wrist sensor 1601 report accelerations on all three axis (X, Y, and Z) when the inertial sensor is moving/on and connected. The system 73 and/or the system 74 can process raw data coming off of the sensor components to determine when the sensor was snapped which correlates with ball release frame. Therefore, the system 73 and/or the system 74 determines when these components are at their peak and captures a point in the motion where this occurs. For example, because there are three axes that can be used for reference, the system 73 and/or the system 74 may capture all three and use the average to determine the actual frame the event occurred.

Figure 9:
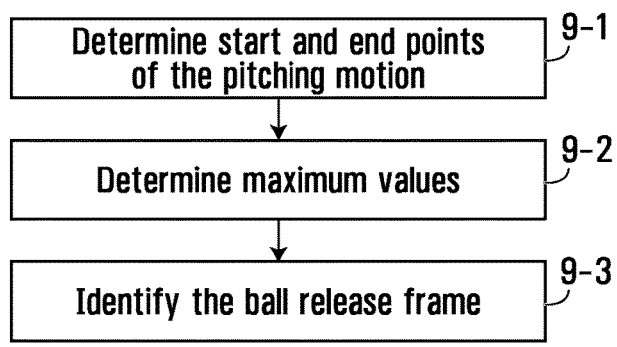
FIG. 9 is a flowchart of a method of determining ball release frame of an athletic throwing motion.

Referring now to FIG. 9, shown is a flowchart of a method of determining ball release frame of an athletic throwing motion. This method is described below in relation to the motion instruction system 74 shown in FIG. 4. The method can be executed by a computer, for example the server 1709 or the observer device 1703. However, it is to be understood that the method can be executed by other systems, for example the motion analysis system 73 of FIG. 2.

At step 9-1, the system 74 detects where a start of the athletic throwing motion occurred. In some implementations, to detect a start frame, the system 74 iterates forwards through a wrist sensor data array and find the first frame where the sum of the magnitudes of the X, Y, and Z accelerations exceed a fixed threshold (e.g. 50 m/s^2). Then the system 74 can subtract a fixed number of frames (e.g. 200 frames) from that frame number. If the frame value returned by that subtraction is not positive, the system 74 may set it to a time near the beginning of the data array and start the detection from there. The system 74 can then find and return an appropriate end of the data to look at. In some implementations, the system 7 adds a fixed number of frames to the start frame (e.g. end frame=start frame+500 frames).

At step 9-2, the system 74 runs an algorithm from the start to the end points to search for max values. In some implementations, each accelerometer is checked for a max value, and when a new max is found, it and its point within the motion are stored. As the system 74 goes through each piece of data in the array, if that piece of data has a higher number than the already stored max, the system 74 updates the max value and the point in time where the max value is found, until the entire motion between the start and end points is processed.

At step 9-3, once the system 74 has found the max values for each accelerometer, the system 74 determines the ball release frame based on when the maximum values occur. In some implementations, the points in time that the max values occurred are averaged (e.g., added and divided by three) to identify the point in time when the ball was released. In other implementations, rather than averaging the points in time that the max values occurred, the system 74 uses a median value to identify the point in time when the ball was released. Other implementations are possible.

In some implementations, the system 74 generates constructive feedback regarding the athletic throwing motion based on the Ball Release frame. For example, if the pelvis rotation is −10 degrees at the ball release frame, while elite pitchers achieve a pelvis rotation between −5 and +5 degrees at the ball release frame, constructive feedback can be generated to convey this difference (e.g. visual indication or other indication to show −10 degrees at ball release frame falling outside of a range of −5 to +5 degrees at ball release frame). Other possibilities exist for the constructive feedback and are within the scope of the disclosure.

Estimating Sensor Data for Athletic throwing motion.

Figure 10:
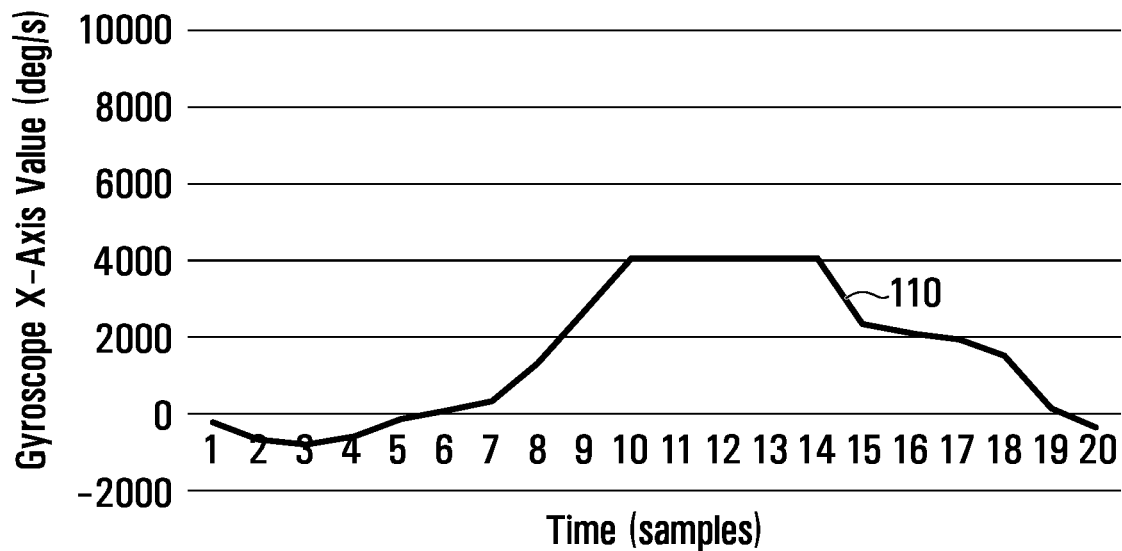
FIG. 10 is a graph of raw gyroscope values from a wrist sensor over time during an athletic throwing motion in which there is a clipped region.

During an athletic throwing motion, sensors placed on the arm (e.g. upper arm, lower arm and/or wrist) can move very rapidly. Depending on skill level, it may be possible for accelerometers and gyroscopes to exceed their dynamic range. When this happens, accelerometer and gyroscope values clip (i.e. max out) for a period of time. For example, with reference to FIG. 10, shown is a graph of raw gyroscope values 110 from a wrist sensor 1601 over time during an athletic throwing motion in which there is a clipped region. In this graph, the raw gyroscope values 110 clip at a max value of 4,000 deg/s in the clipped region from time samples 10 through 14.

Unfortunately, the sort of clipping described above can lead to gyroscope or accelerometer error, which in turn can then lead to error in any calculation that depends on gyroscope or accelerometer data. As an example, an orientation estimation that is computed by a sensor fusion algorithm as a function of gyroscope, magnetometer and accelerometer data, could become error prone. To mitigate error, the system 74 can estimate or predict what the gyroscope or accelerometer values would hypothetically be in the clipped region had the sensor supported a greater dynamic range to avoid the clipping. Although the examples and the discussions that follow below focus on gyroscope values on an x-axis, it is to be understood that the teachings herein can be applied to any sensor values in which there may be clipping, including gyroscope values and accelerometer values, and on any axis, including an x-axis, a y-axis and a z-axis.

Figure 11:
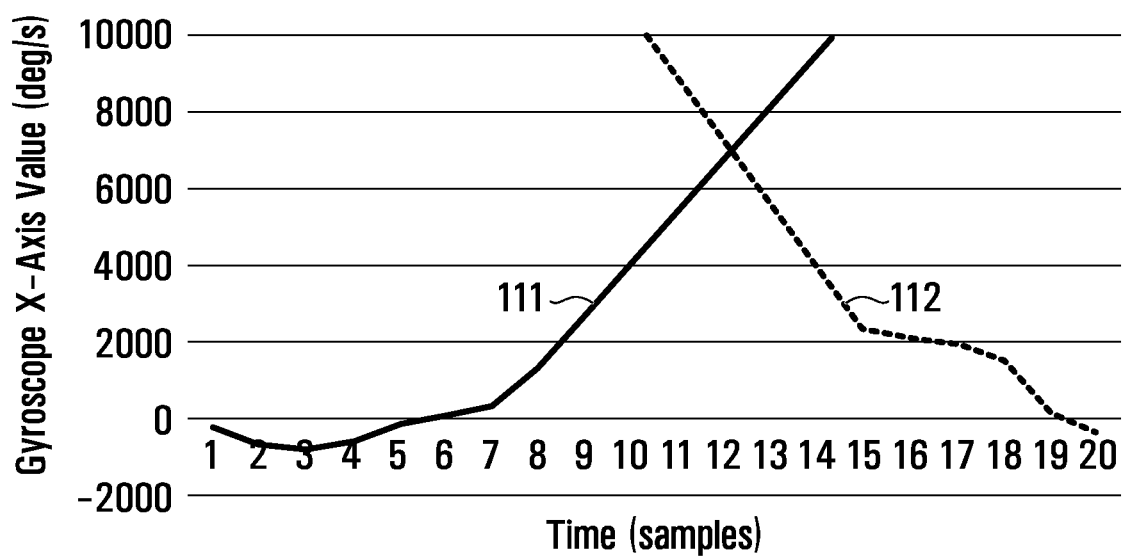
FIG. 11 is a graph of extrapolated gyroscope values in the clipped region.
Figure 12:
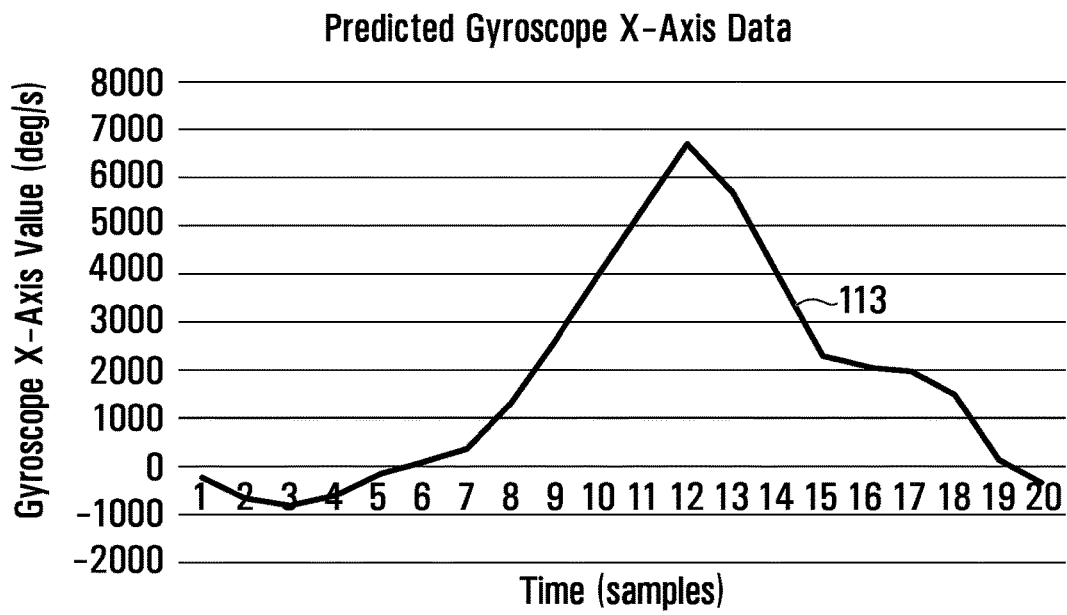
FIG. 12 is a graph of predicted gyroscope values based on the extrapolated gyroscope values.

In accordance with an embodiment of the disclosure, the system 74 extrapolates the raw gyroscope values 110 beyond the max value. There are many ways that this can be accomplished. In some implementations, the extrapolation is performed using linear interpolation based on data points near where the clipping starts and stops. Note that there are data points on both sides of the clipping, and hence linear interpolation can be performed on both sides of the clipping as shown in FIG. 11, which is a graph showing forward extrapolated gyroscope values 111 and backward extrapolated gyroscope values 112 in the clipped region. For each time point in the clipped region, the system 74 can calculate a minimum of the forward extrapolated gyroscope values 111 and the backward extrapolated gyroscope values 112 to produce predicted gyroscope values 113 as shown in FIG. 12. For each time point outside of the clipped region, the system 74 can simply utilize the raw gyroscope values 110 for the predicted gyroscope values 113. Further details are provided below with reference to FIG. 12.

Figure 13:
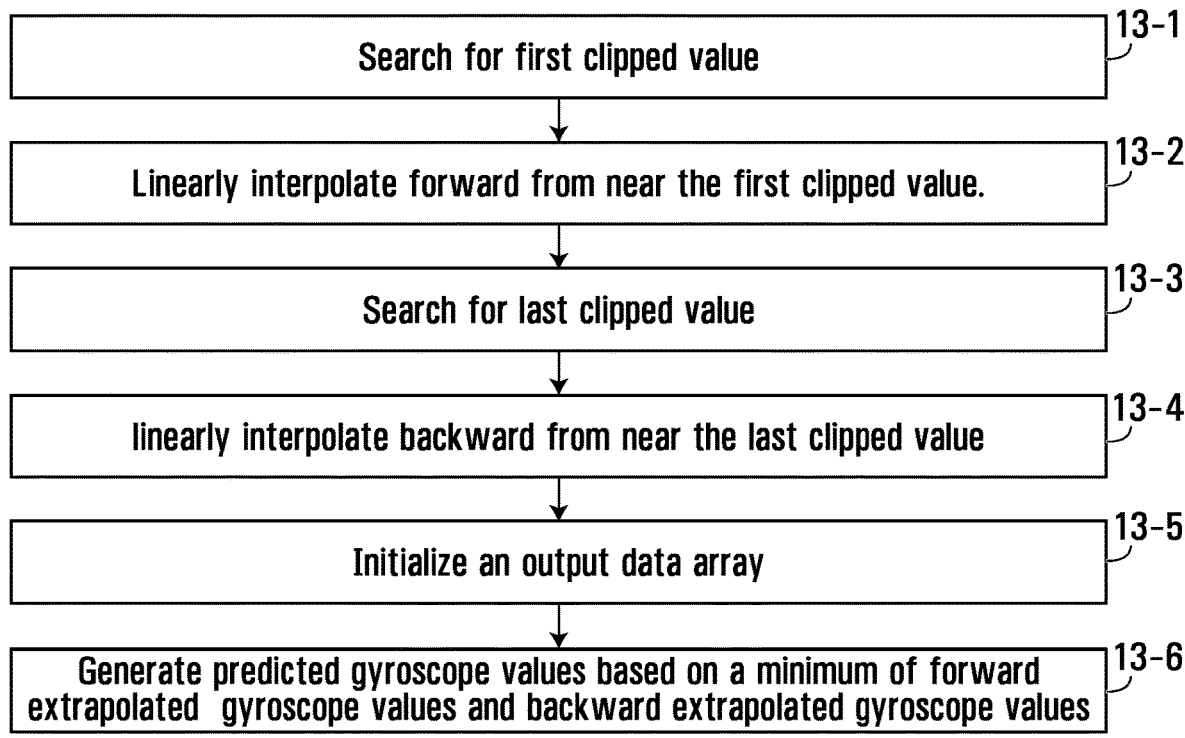
FIG. 13 is a flowchart of a method of determining predicted gyroscope and accelerometer values in a clipped region.

Referring now to FIG. 13, shown is a flowchart of a method of determining estimated gyroscope and accelerometer values in a clipped region. This method is described below in relation to the motion instruction system 74 shown in FIG. 4. The method can be executed by a computer, for example the server 1709 or the observer device 1703. However, it is to be understood that the method can be executed by other systems, for example the motion analysis system 73 of FIG. 2.

At step 13-1, the system 74 looks for a first clipped value. For example, the system 74 can start from the first sample in the raw gyroscope values and move forwards until the first clipped value is observed, which in this case is at time sample 10.

At step 13-2, the system 74 linearly interpolates data based on at least two data points near the first clipped value. In some implementations, the system 74 calculates a slope using the first clipped value (i.e. time sample 10) and its previous sample (i.e. time sample 9), and extrapolates forward using that slope. In other implementations, the system 74 calculates the slope using the two data points that immediately precede the clipping, namely time samples 8 and 9 in this example. In other implementations, a combination of extrapolation techniques can be employed.

At step 13-3, the system 74 looks for a last clipped value. For example, the system 74 can start from the last sample in the raw gyroscope values and move backwards until the last clipped value is observed, which in this case is at time sample 14.

At step 13-4, the system 74 linearly interpolates data based on at least two data points near the last clipped value. In some implementations, the system 74 calculates a slope between the last clipped value (i.e. time sample 14) and its next sample (i.e. time sample 15), and extrapolates backwards using that slope. In other implementations, the system 74 calculates the slope using the two data points that immediately follow the clipping, namely time samples 15 and 16 in this example. In other implementations, a combination of extrapolation techniques can be employed.

In some implementations, at step 13-5 the system 74 initializes an output data array of the same length as the original raw gyroscope data array (i.e. 20 time samples in this example).

At step 13-6, for each time point in the clipped region, the system 74 calculates a minimum of the forward extrapolated gyroscope values 111 and the backward extrapolated gyroscope values 112 to produce predicted gyroscope values 113. For example, for each sample value starting from the last sample value of the backwards extrapolated data 112, the system 74 can check if the sample value is less than a corresponding sample value for the forwards extrapolated data 111. If so, the system 74 can copy the sample value from the backwards extrapolated data 112 into an output data array. If not, the system 74 can copy the sample value from the forward extrapolated data 111 into the output data array.

At conclusion of the method, the system 74 has produced the predicted gyroscope values 113. Notably, the predicted gyroscope values 113 can be utilized instead of the raw gyroscope values 110 when performing any calculation that may depend on gyroscope data. Utilizing the predicted gyroscope values 113 instead of the raw gyroscope values 110 can mitigate error.

Auto-Detection of Throwing Motion

In some implementations, the system 74 is configured to automatically detect a throwing motion based on motion data collected from inertial sensor(s), for example the wrist sensor 1601 and the torso sensor 1603. Around the time that a ball is released during a throwing motion, the sensors will move in such a way that the gyroscopes and the accelerometers should detect spikes on at least one of their axes while the sensor orientation is not changing very quickly (i.e. no spikes on any of euler yaw, euler pitch, or euler roll). An example algorithm that can be executed by the system 74 to auto-detect an athletic throwing motion is described below.

Figure 14:
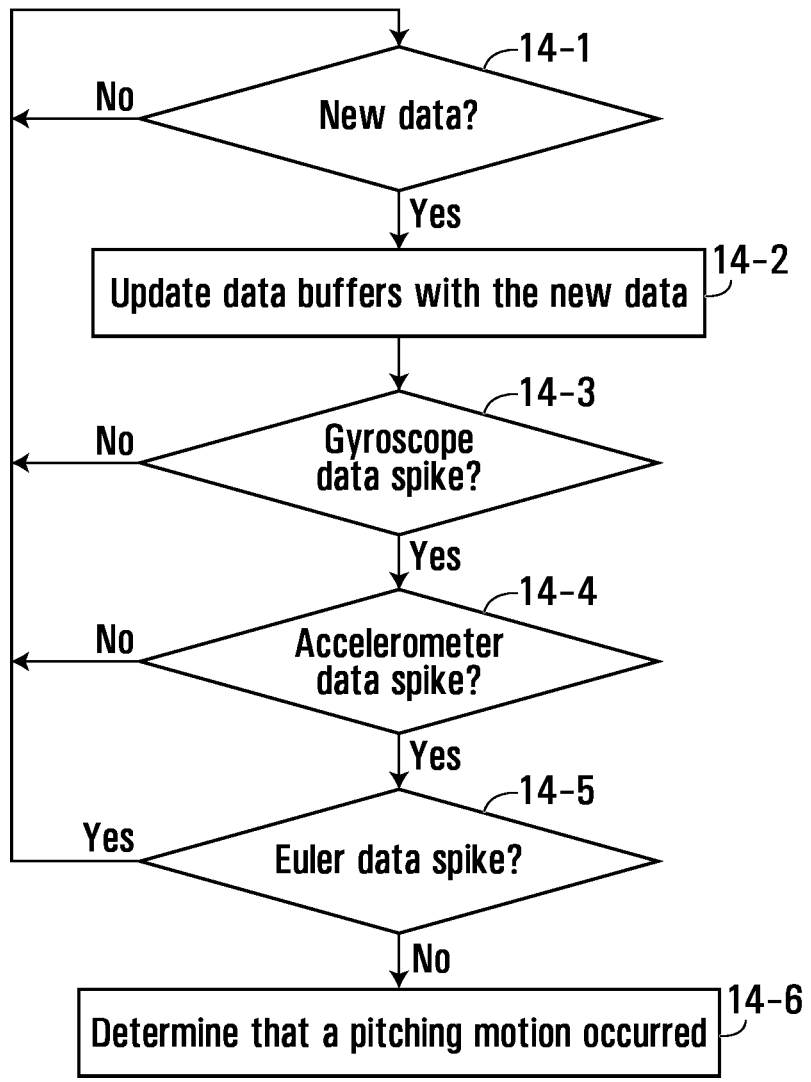
FIG. 14 is a flowchart of a method of detecting an athletic throwing motion based on motion data.

Referring now to FIG. 14, shown is a flowchart of a method of detecting a throwing motion based on motion data. This method is described below in relation to the motion instruction system 74 shown in FIG. 4. The method can be executed by a computer, for example the server 1709 or the observer device 1703. However, it is to be understood that the method can be executed by other systems, for example the motion analysis system 73 of FIG. 2 or the motion analysis system 74 of FIG. 4.

At step 14-1, the system 74 checks for new data from a lower arm sensor, which can be worn on a user's wrist for example. In some implementations, the system 74 checks for the new data on a periodic basis, for example every 5 ms or some other fixed increment of time. In other implementations, no polling is performed by the system 74 and new data is simply received from sensors.

In some implementations, if new data is available, then at step 14-2 the system 74 updates data buffers. In some implementations, each data buffer holds three samples. However, other implementations are possible in which more or less samples are held by the data buffers. In some implementations, there is a data buffer for each of gyroscope x-axis, gyroscope y-axis, gyroscope z-axis, accelerometer x-axis, accelerometer y-axis, accelerometer z-axis, euler yaw, euler pitch, and euler roll. However, other implementations are possible with fewer or more data buffers.

At step 14-3, the system 74 checks if there are any data spikes on at least one of the gyroscope axes exceeding a fixed gyroscope spike threshold. This is because a gyroscope data spike can be indicative of an athletic throwing motion. If no gyroscope data spikes are detected, the system 74 returns to step 14-1 because no throwing motion is detected.

At step 14-4, the system 74 checks if there are spikes on at least one of the accelerometer axes that exceed a fixed accelerometer spike threshold. This is because an accelerometer data spike can be indicative of an athletic throwing motion. If no accelerometer data spikes are detected, the system 74 returns to step 14-1 because no throwing motion is detected.

At step 14-5, the system 74 checks if there are spikes on at least one of the euler yaw, euler pitch, or euler roll that exceed a fixed euler spike threshold. This is because euler data spikes are not expected at the time that the ball is released. If any euler data spikes are detected, the system 74 returns to step 14-1.

If data spikes are detected at steps 14-3 and 14-4, and no data spike is detected at step 14-6, then at step 14-6 the system 74 determines that an athletic throwing motion has occurred.

Figure 15:
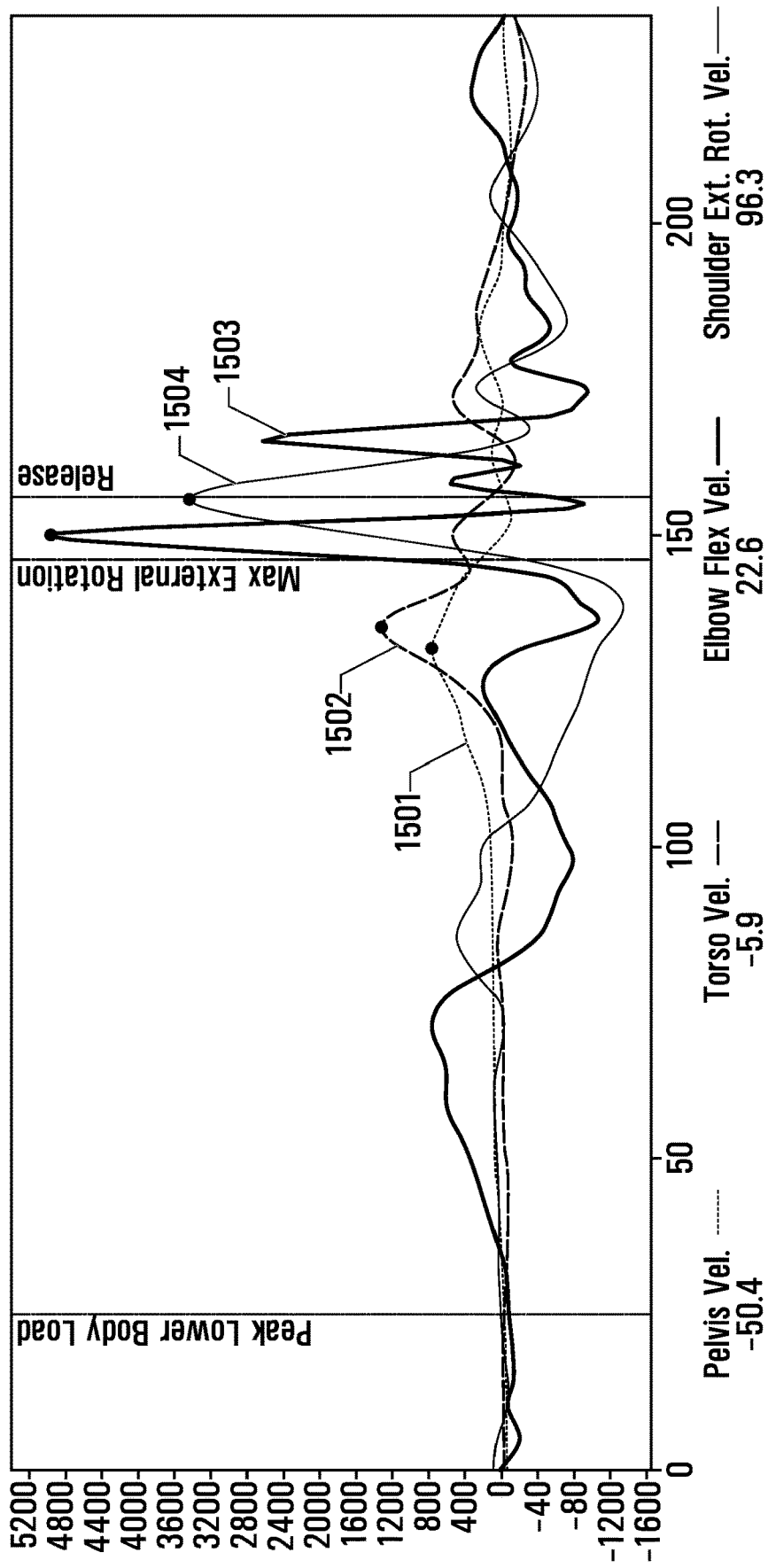
FIG. 15 is a kinematic sequence graph showing various velocities during an athletic throwing motion.

Referring now to FIG. 15, shown is a kinematic sequence graph showing various velocities during an athletic throwing motion. The velocities that are shown include a pelvis rotational velocity 1501, a torso rotational velocity 1502, an elbow flexion velocity 1503 and a shoulder external rotation velocity 1504. Data spikes can be found between data samples 125 to 175, suggesting the athletic throwing motion. In some implementations, the system 74 searches for data spikes on all four velocities within a defined time window. If found, the system 74 determines that an athletic throwing motion has occurred. Otherwise, the the system 74 determines that no athletic throwing motion has occurred.

Auto Capture

One or more embodiments of the disclosure can include an auto capture system in which data capture from the sensors 1702 (e.g., inertial sensors having a gyroscope, an accelerometer and/or a magnetometer, heat sensors, image sensors (e.g., cameras) capturing still images and/or video images, optical body motion sensors, and/or the like) is triggered by a specific input (e.g., a motion or gesture).

In such embodiments, streaming data may be processed in real time, or near real time, and when a specific input (e.g., gesture) is recognized (e.g., a baseball pitch), a time window of sensor data is automatically recorded. The time window being taken from a predetermined time period around the moment in time in which the specific input was recognized (e.g., when the baseball pitch occurred). For example, the predetermined time period may include 2 seconds before the moment in time when the specific input was recognized and 3 seconds after the moment in time when the specific input was recognized.

Referring back to FIG. 3, gesture recognition can be performed by a processor of the motion analysis system 74 (e.g. a processor of one of the participant devices 1701a-c, a processor of the observer device 1703, and/or a processor of the server 1709). The following disclosure refers to the motion analysis system 74 of FIG. 3, although it is noted that gesture recognition can also be implemented by the motion analysis system 73 of FIG. 2. For the purposes of this discussion referring to FIG. 3, the participant device 1701, the observer device 1703, and the server 1709 are collectively referred to herein as the "CPU". Here, sensor data is continuously wirelessly streamed from the sensors 1702 to a transceiver of the CPU. The sensor data is transmitted to the transceiver of the CPU regardless of whether any motion gesture (e.g., baseball pitch, etc.) has occurred. The transmitted sensor data can be buffered in a data buffer of the CPU. Upon recognition of the motion gesture, the CPU extracts from the data buffer sensor data in which is a predetermined time window around the moment in which the gesture took place, including before the gesture was recognized. The extracted sensor data is then processed by the CPU to generate a set of exercises for participants based on the sensor data received from the participant device 1701.

Alternatively, gesture recognition for an auto capture system can be performed with an algorithm and processing being performed in the sensors 1702 themselves, as opposed to the CPU. Wirelessly transmitting sensor data from the sensors 1702 to the CPU transceiver requires significant power consumption that monotonically scales (i.e., increases) with greater transmission distance. Thus, it may be advantageous (e.g., with regard to power consumption and CPU processor efficiency) to perform gesture recognition locally on the sensor, and only transmit data to the CPU when a motion gesture is recognized. The transmitted data may include only sensor data in a predetermined time window around the moment in which the gesture took place, including before the gesture was recognized. This can be achieved in one embodiment through the use of a local data buffer in the sensors 1702. The local data buffers 1725 can exist in one or more of the sensors 1702. The sensors 1702 can be considered separate from each other or be ganged or networked together in some relationship configuration. For example, sensor data may be transmitted from one or more sensors 1702 to a local data buffer existing in another sensor 1702. The aggregate sensor data from the sensors can then be transmitted from that local data buffer to the transceiver of the CPU.

For example, an exemplary sensor 1702 itself may comprise an inertial sensor, a local processor, a local data buffer, and a transceiver. The sensor data is initially buffered in the local data buffer. Alternatively, one or more sensors may include more or less components. Upon recognition by the local processor of a motion gesture, the local processor extracts from the local data buffer sensor data in a predetermined time window around the moment in which the gesture took place, including before the gesture was recognized. Only the extracted buffer sensor data is wireless transmitted to a transceiver of the CPU. Thus, in this embodiment, the algorithm and processing for motion gesture is performed in the sensor as opposed to the CPU. The transmitted sensor data include only sensor data in a predetermined time window around the moment in which the gesture took place, which can be advantageous in that it decreases wireless sensor data transmission and corresponding power thereby potentially improving efficiency.

For example, in for a baseball pitch, movement that occurs may result in a particular signature of at least one of acceleration data, body segment orientation data, and rotational velocity data. This movement can be measured by inertial sensors, such as the inertial sensors 1601 to 1604 shown in FIGS. 4A to 4C. The signature can then be used to automatically identify a particular motion gesture (e.g., baseball pitch). Then, as discussed above, a predetermined time window of the sensor data may be analyzed by the system.

Autonomous Training

According to another embodiment, there is provided an autonomous training system, wherein a regime file (e.g., list of recommended exercises) is customizable for individual participants based on data in a participant database. The customizable regime files may be of particular use with (although not limited to) large groups of participants wherein each participant is at a different level of proficiency. The customizable regime files allow all participants to be together but some to work completely alone (without coaching or training) while others receive coaching; and where all of the participants receive unique versions of the same program based on the individual participant profiles.

Various data fields may be associated with the exercise database 1705, the participant database 1707, observer database (not shown), and motion database (not shown), which may be collectively used to generate the regime file. In alternative embodiments, additional or different data may be used to generate the regime file.

The participant database 1707 may store user or participant related information. The information stored therein may include data fields such as Participant ID, Participant Name, Participant Height, Participant Weight, etc.

The observer database (not shown) may store observer (e.g., coach, trainer, etc.) related information. The information stored therein may include data fields such as Observer ID, Observer Name, Associated Participants (e.g., participants associated with the observer, such as a class of 50 trainees), Generated Regime Files, etc.

The exercise database 1705 may store exercise related information. For purposes herein, it is understood that "exercise" may include a training exercise (e.g., bend at address) as well as movements such as a baseball pitch. Each exercise may include one or more component motions. The information stored therein may include data fields such as Exercise ID, Exercise Name, Scoring Function, Attribute Tags, Tolerance Variables, etc.

The motion database (not shown) may store captured motion data for an exercise. The information stored therein may include data fields such as Sensor Data (e.g., inertial, video, etc.), Outcome Data (e.g., launch monitor, etc.), Participant ID, Exercise ID, a Timestamp, etc.

In a non-limiting example, when an Exercise ID (e.g., ID for baseball pitch) and Participant ID are input, the observer device 1703 and/or the server 1709 utilizes data from the exercise database 1705, the participant database 1707, the observer database (not shown), and the motion database (not shown) to generate a regime file customized to the participant. The regime file may be generated autonomously using a content-based filtering approach, which leverages a machine learning model trained on data associated with a participant matching the Participant ID input (discussed in more detail below). Alternatively, the regime file may be generated autonomously using a collaborative filtering approach, which leverages a machine learning model trained on data associated with all participants. Alternatively, the regime file may be generated with a hybrid approach of both content-based filtering and collaborative filtering. Thus, the observer device 1703 and/or the server 1709 may be configured to automatically generate a set of exercises for participants based on diagnostic and/or performance parameters of the sensor data received from the participant devices 1701.

In a non-limiting example, generating the regime file using the content-based filtering approach may involve having a library or exercise database 1705 of N different training exercises for which an exercise vector of length N can be initialized and updated as follows:

Initialization: For a new user, initialize the exercise vector to the zero vector. For example, for a library of 5 exercises including "Rotation at Impact", "Bend at Address", "Rotation at Impact", "Hip Twister", and "Duck Walks", the exercise vector would be initialized to [0, 0, 0, 0, 0].

Update Algorithm:

STEP 1: After a specific interval of time after a user performs one or more training exercises, calculate an output score ($S_{AFTER}$) based on all baseball pitches taken since the training exercises were performed. For example, this score could be the average MER for all baseball pitches taken within 12 hours since the last of the training exercises was performed.

STEP 2: Calculate an output score ($S_{BEFORE}$) based on all baseball pitches taken within a specific interval of time before the user performed the training exercises. For example, this score could be the average MER for all baseball pitches taken within 12 hours before the first of the training exercises was performed.

STEP 3: Calculate the change in output scores as: $\Delta S = S_{AFTER} - S_{BEFORE}$.

STEP 4: For each of the exercises that were performed in this iteration, add the change in output scores to the corresponding element of the exercise vector.

Exercise Recommendation Algorithm: For each user, the exercise vector provides a means of ranking training exercises based on how much they improve the output score of interest. For example, an exercise recommendation algorithm could be to recommend M exercises with the highest values in the exercise vector, where M<=N. However, this approach may be prone to converge on a local optimum as soon as M exercises achieve values greater than 0 in the exercise vector. Another exercise recommendation algorithm could be to recommend M+L exercises (where M+L<=N), including M exercises with the highest values in the exercise vector and L exercises chosen at random from the remaining N-M exercises. The disclosure is of course not limited to these two exemplary content-based filtering exercise recommendation algorithms.

In a non-limiting example, a collaborative filtering approach for generating the regime file may involve implementing a collaborative filtering algorithm by extending the content-based filtering approach described above. In order to do this, for example, an augmented exercise vector of length N may be defined. The elements of a user's augmented exercise vector corresponding to exercises that have been performed at least once by the user are assigned the same values as the corresponding elements in the user's exercise vector. The elements of a user's augmented exercise vector corresponding to exercises that have never been performed before by the user are assigned the same values as the corresponding elements in the exercise vector of the user in the participant database who is most similar to the user of interest. Similarity between two users can be determined by the inner product of their normalized exercise vectors (higher values indicate greater similarity). With the foregoing technique, an exercise recommendation algorithm could be that for each user, recommend M+L exercises (where M+L<=N), including M exercises with the highest values in the augmented exercise vector and L exercises chosen at random from the remaining N-M exercises. The disclosure is of course not limited to the foregoing collaborative filtering exercise recommendation algorithm.

In one or more of the foregoing embodiments, the motion analysis system 74 can be used to train a user based on captured data. For example, instrumenting a user with sensors (e.g., inertial or movement sensors) and optionally with video cameras, time of flight cameras, or radar-based systems capable of capturing 2D or 3D scene information at regular time intervals, and/or a force plate that measures compression and tension forces, normal to the flat top surface of the plate; monitoring a baseball pitch; capturing or auto capturing motion data of interest; drawing upon and contributing to a library of performance data for analysis of the test results; scoring the motion; providing an information rich, graphic display of the results in multiple formats including video, color coded and stepped frame animations from motion data, and synchronized data/time graphs; and based on the results prescribing a user-specific training regime. As discussed above, the motion analysis system 74 may apply machine learning techniques to learn relationships, functions, and categories associated with various analysis procedures, which may include modeling or scoring a particular motion gesture (e.g., baseball pitch) or exercise based on the sensor data.

Motion Similarity, Biofeedback & Auto-Training

Figure 16:
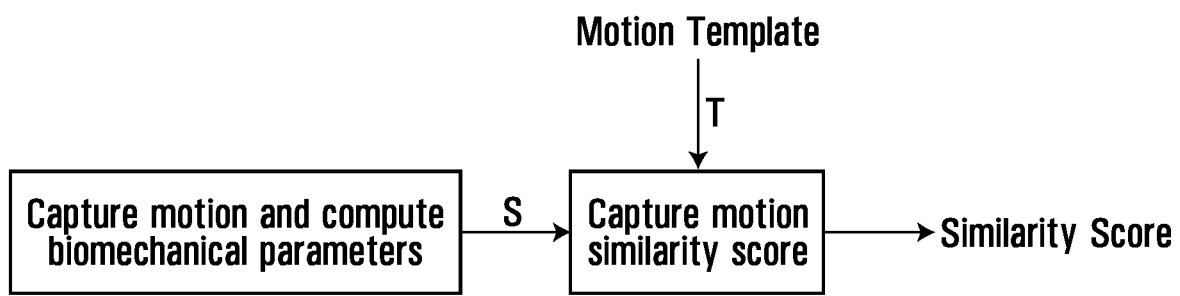
FIG. 16 is a block diagram of an exemplary process for computing a motion similarity score.

Referring now to FIG. 16, shown is a block diagram of an exemplary process for computing a motion similarity score. As shown, the motion analysis system 74 computes a motion similarity score based on a comparison of biomechanical parameters computed for a captured motion to a motion template stored in a database. The motion template may have been generated from a single captured motion (e.g., best pitching movement), multiple captured motions (e.g., top 5 best pitching movements), or manually synthesized.

Based on the similarity score, the motion instruction system 74 can then generate an auditory, visual, and/or haptic biofeedback signal. The biofeedback signals may be different depending on the similarity score. For example, the similarity score may range from 0 to 100, with zero being ideal and 100 representing a high divergence from the ideal. In this example, a red light might follow an exercise in which a derived biomechanical parameter badly diverged from ideal (e.g., score of 50-100), a yellow light might follow an exercise in which a derived biomechanical parameter only somewhat diverged from ideal (10-49), and a green light might follow an exercise in which a derived biomechanical parameter is ideal or diverged from ideal by less than the pre-assigned margin of error (0-9). The signal light may be the background color of an animation or avatar displayed on the participant device 1701a-c and/or the observer device 1703, or another display or recipient device that is configured to convey feedback to the user. Similar differences in biofeedback signals could be done using audio or haptic signals.

Furthermore, unlike static posture training, where only differences in posture are considered, the dynamic biofeedback similarity score may also capture differences in timing.

An exemplary algorithm for generating a similarity score is described below:

STEP 1: Create a motion template T in the form of an M×N matrix, where each of M rows represents a motion parameter time series of length N. For example, the motion template may include timestamps or time samples that are evenly spaced in time based on a sampling rate (e.g., 200 Hz so that the samples are 5 ms apart). Alternatively, the motion template may include time spacing that is unequal in order to capture key moments in an athletic throwing motion. The motion parameters may include but are not limited to 3D orientation data (yaw, pitch, roll); raw 3-axis sensor data (accelerometer$_x$, accelerometer$_y$, accelerometer$_z$, gyroscope$_x$, gyroscope$_y$, gyroscope$_z$, magnetometer$_x$, magnetometer$_y$, magnetometer$_z$) from one or more inertial sensors; sensor data from other sensors such as heat sensors, image sensors (i.e., cameras) capturing still images and/or video images, optical body motion sensors, and the like; as well as subsequently derived biomechanical parameters. The biomechanical parameters may include, for example, one or more of: 'Shoulder Flexion', 'Hip Flexion', 'Hand Flexion', 'Upper Arm Flexion', 'Shoulder Tilt', 'Hip Tilt', 'Hand Tilt', 'Upper Arm Tilt', 'Shoulder Alignment', 'Hip Alignment', 'Hand Alignment', 'Upper Arm Alignment', 'Shoulder Rotation', 'Hip Rotation', 'Hand Rotation', 'Upper Arm Rotation', 'Pelvis Rotation', 'Torso Rotation', 'Shoulder Lateral Bend', 'Hip Lateral Bend', 'Hand Lateral Bend', 'Upper Arm Lateral Bend', 'Shoulder Pitch', 'Hip Pitch', 'Hand Pitch', 'Upper Arm Pitch', 'Shoulder Angle', 'Hip Angle', 'Hand Angle', 'Upper Arm Angle', 'Shoulder Direction', 'Hip Direction', 'Hand Direction', 'Upper Arm Direction', 'Torso Rotational Velocity', 'Pelvis Rotational Velocity', 'Hand Rotational Velocity', 'Upper Arm Rotational Velocity', 'Spine Angle', 'Pelvis Angle', 'Wrist Angle', 'Spine Direction', 'Pelvis Direction', 'Wrist Direction', 'Upper Body Bend', 'Upper Body Side Bend', 'Pelvis Bend', 'Pelvis Side Bend'.

STEP 2: Build an M×K matrix S from a captured motion including K samples, where K≥N, such that each of M rows represents the same motion parameters as in the motion template matrix T.

STEP 3: Align S to T using cross-correlation and truncate non-overlapping columns as follows:

i. Select a motion parameter row to use for alignment (e.g. torso sensor yaw).

ii. Calculate the lag τ between $T_{i,*}$ and $$S_i * as : \tau = \underset{n}{\mathrm{argmax}}(T_{i,*} \star S_{i,*})[n]$$

iii. If 0≤τ≤K−N, truncate the first τ columns and last (K−N−τ) columns of S to yield M×N matrix $$\hat{S} = \begin{bmatrix} s_{0,\tau} & \cdots & s_{0,\tau+N-1} \\ \vdots & \ddots & \vdots \\ s_{M,\tau} & \cdots & s_{M,\tau+N-1} \end{bmatrix}.$$

Else, if τ<0 or τ>K−N, stop here and raise an error indicating that the captured motion does not contain data matching the entire template.

STEP 4: Compute the overall similarity score as a weighted sum of normalized root mean square error (NRMSE) values between corresponding rows of Ŝ and T:

$$\text{Similarity Score} = \sum_{i=0}^{M} w_i * \frac{\| T_{i,*} - \hat{S}_{i,*} \|}{\| T_{i,*} \|}$$

where each value $w_i$ is a scalar weight applied to the NRMSE for row i.

According to one or more of the foregoing embodiments, the biofeedback mode of the motion instruction system 74 allows a user to "train to his or her best motion." According to a non-limiting example, such training may be accomplished by:

(1) storing motion data for one or more captured motions for an exercise in a motion database;

(2) computing and assigning a score for each captured motion. Such scoring can be assigned manually through user-tagging, or, as discussed above, computed automatically through a scoring algorithm based on a comparison of biomechanical parameters computed for a captured motion to a motion template stored in a database;

(3) computing the user's "best motion" based on a comparison of the captured motion data and assigned scores; and (4) generating a corresponding set of static postures and/or motion templates for use in biofeedback training exercises.

According to one or more of the foregoing embodiments, the motion instruction system 74 may generate comprehensive user health, fitness, and skill scores based on many component diagnostic scores. Although some prior embodiments describe "activity categories," it is understood that such activity categories may relate to exercises, which can include training exercises (e.g. bend at address) and specific motions (e.g. athletic throwing motion) and "diagnostic scores," and the concept of "scoring functions" can be assigned to each exercise. The outputs of these scoring functions may be used to represent performance on specific training exercises, quality of specific motions, and even things like range of motion for particular body segments. Furthermore, group health, fitness, and skill scores can be generated for groups of users (e.g. teams or organizations) based on the individual user health, fitness, and skill scores of their members. This may be beneficial for group competitions where one group of users competes against another group of users, such as in a group training class.

According to one or more of the foregoing embodiments, the motion instruction system 74 may be configured to continually monitor user compliance with a training regime. For example, user compliance with an exercise regime (e.g., assigned exercise score is above a predetermined threshold), or lack thereof (e.g., assigned exercise score is below a predetermined threshold, or the assigned exercise is not being performed), may be transmitted to an observer (via text message, e-mail message, alert on web portal, etc.). Preferably, such alert is transmitted to the coach or observer in real time so that the exercise regime may be revised or changed accordingly.

According to one or more of the foregoing embodiments, the motion instruction system 74 may further comprise a video camera. When used, the video camera, when used, should be positioned to insure alignment with the individual under test and useful points of reference for measurement and analysis of the motion. Sensor data may be collected from sensors and video signal from the camera during execution of the throwing motion. The Report 400 may include the generation of a unique display of synchronized video, motion animation, and data/time graphs.

Numerous modifications and variations of the present disclosure are possible in light of the above teachings. It is therefore to be understood that within the scope of the appended claims, the disclosure may be practised otherwise than as specifically described herein.

We claim:

1. A method of analyzing an athletic throwing motion by an individual, the method being executed by a motion monitoring system comprising at least one computer and at least one inertial sensor for sensing movement of the individual, the method comprising:

receiving, by the at least one computer, inertial sensor data from the at least one inertial sensor during execution of the athletic throwing motion by the individual;

analyzing, by the at least one computer, the athletic throwing motion by determining at least one metric from the inertial sensor data; and generating, by the at least one computer, constructive feedback regarding the athletic throwing motion based on the at least one metric;

wherein determining at least one metric from the inertial sensor data comprises pre-processing raw sensor data to produce predicted sensor data when there is a clipped region in the raw sensor data due to a dynamic range of the at least one inertial sensor being exceeded, wherein the at least one metric comprises max load frame of the individual as determined by when the inertial sensor data indicates a pelvis of the individual being rotated furthest back in the athletic throwing motion, and wherein determining when the inertial sensor data indicates the pelvis being rotated furthest back comprises:

determining where to start and end looking in the inertial sensor data for a minimum value for pelvis rotation, determining the minimum value for the pelvis rotation in the inertial sensor data and a frame at which the minimum value occurs, and if the frame matches a defined criteria, identifying that frame as the max load frame, whereby the constructive feedback regarding the athletic throwing motion is based on the max load frame.

2. The method of claim 1, wherein the at least one metric comprises peak pelvis speed frame of the individual as determined by when the inertial sensor data indicates a maximum rotational velocity for a pelvis of the individual in the athletic throwing motion.

3. The method of claim 2, wherein determining the maximum rotational velocity for the pelvis comprises:

determining where pelvis rotational velocity values are stored after they have been calculated based on acquired data;

searching for a maximum value for the pelvis rotational velocity; and if the maximum value is found, identifying the peak pelvis speed frame as the frame at which the maximum value occurred, whereby the constructive feedback regarding the athletic throwing motion is based on the peak pelvis speed frame.

4. The method of claim 1, wherein the at least one metric comprises MER (Max External Rotation) frame, which is a point in the athletic throwing motion when the inertial sensor data indicates a throwing arm of the individual being furthest back upon winding back.

5. The method of claim 4, wherein determining the MER frame comprises:

determining where external rotation values are stored after they have been calculated based on acquired data;

searching for a maximum value for the external rotation values; and if the maximum value is found, identifying the MER frame to be the frame at which the maximum value occurs, whereby the constructive feedback regarding the athletic throwing motion is based on the MER frame.

6. The method of claim 1, wherein the at least one metric comprises ball release frame which is a moment when the inertial sensor data indicates the individual releases a ball in the athletic throwing motion.

7. The method of claim 6, wherein determining the ball release frame comprises:

determining start and end points of the athletic throwing motion;

determine a maximum value for each of three axis of the inertial data;

determining the ball release frame as a function the maximum value for each axis, whereby the constructive feedback regarding the athletic throwing motion is based on the ball release frame.

8. The method of claim 1, wherein pre-processing the raw sensor data to produce the predicted sensor data comprises:

linearly interpolating forward from near a first clipped value to produce forward extrapolated gyroscope values;

linearly interpolating backward from near a last clipped value to produce backward extrapolated gyroscope values; and generating the predicted sensor data based on a minimum of the forward extrapolated gyroscope values and the backward extrapolated gyroscope values.

9. The method of claim 1, further comprising:

evaluating, by the at least one computer, a measure of success of the athletic throwing motion based on a similarity score;

wherein generating the constructive feedback comprises generating biofeedback in a form that differs between a successful athletic throwing motion and an unsuccessful athletic throwing motion.

10. The method of claim 1, further comprising:

evaluating, by the at least one computer, a measure of success of the athletic throwing motion based on a similarity score;

wherein generating the constructive feedback comprises identifying a set of exercises for the individual to perform related to the athletic throwing motion.

11. A non-transitory computer readable medium having recorded thereon statements and instructions that, when executed by at least one processor, configure the at least one processor to implement the method of claim 1.

12. A motion monitoring system, comprising:

at least one inertial sensor configured for sensing movement of an individual during an athletic throwing motion;

at least one computer having motion monitoring circuitry configured for receiving inertial sensor data from the at least one inertial sensor during execution of the athletic throwing motion by the individual, analyzing the athletic throwing motion by determining at least one metric from the inertial sensor data, and generating constructive feedback regarding the athletic throwing motion based on the at least one metric;

wherein determining at least one metric from the inertial sensor data comprises pre-processing raw sensor data to produce predicted sensor data when there is a clipped region in the raw sensor data due to a dynamic range of the at least one inertial sensor being exceeded, wherein the at least one metric comprises max load frame of the individual as determined by when the inertial sensor data indicates a pelvis of the individual being rotated furthest back in the athletic throwing motion, and wherein determining when the inertial sensor data indicates the pelvis being rotated furthest back comprises:
determining where to start and end looking in the inertial sensor data for a minimum value for pelvis rotation,
determining the minimum value for the pelvis rotation in the inertial sensor data and a frame at which the minimum value occurs, and
if the frame matches a defined criteria, identifying that frame as the max load frame, whereby the constructive feedback regarding the athletic throwing motion is based on the mas load frame.

13. The motion monitoring system of claim 12, wherein the motion monitoring circuitry is configured to pre-process the raw sensor data to produce the predicted sensor data by:
linearly interpolating forward from near a first clipped value to produce forward extrapolated gyroscope values;
linearly interpolating backward from near a last clipped value to produce backward extrapolated gyroscope values; and
generating the predicted sensor data based on a minimum of the forward extrapolated gyroscope values and the backward extrapolated gyroscope values.

14. The motion monitoring system of claim 13, wherein the at least one computer comprises any one or more of a participant device, a server and an observer device.

15. The motion monitoring system of claim 14, wherein the at least one inertial sensor comprises a plurality of inertial sensors including a wrist sensor, an upper arm sensor, an upper torso sensor, and a pelvis sensor.

16. The motion monitoring system of claim 15, wherein the motion monitoring circuitry of the least one computer comprises a processor, and the at least one computer further comprises a non-transitory computer readable medium having recorded thereon statements and instructions that, when executed by the processor, configures the processor as the motion monitoring circuitry.

17. A method of analyzing an athletic throwing motion by an individual, the method being executed by a motion monitoring system comprising at least one computer and at least one inertial sensor for sensing movement of the individual, the method comprising:
receiving, by the at least one computer, inertial sensor data from the at least one inertial sensor during execution of the athletic throwing motion by the individual;
analyzing, by the at least one computer, the athletic throwing motion by determining at least one metric from the inertial sensor data; and
generating, by the at least one computer, constructive feedback regarding the athletic throwing motion based on the at least one metric;
wherein determining at least one metric from the inertial sensor data comprises pre-processing raw sensor data to produce predicted sensor data when there is a clipped region in the raw sensor data due to a dynamic range of the at least one inertial sensor being exceeded,
wherein the at least one metric comprises ball release frame which is a moment when the inertial sensor data indicates the individual releases a ball in the athletic throwing motion,
wherein determining the ball release frame comprises:
determining start and end points of the athletic throwing motion,
determine a maximum value for each of three axis of the inertial data,
determining the ball release frame as a function the maximum value for each axis, whereby the constructive feedback regarding the athletic throwing motion is based on the ball release frame.

18. A method of analyzing an athletic throwing motion by an individual, the method being executed by a motion monitoring system comprising at least one computer and at least one inertial sensor for sensing movement of the individual, the method comprising:
receiving, by the at least one computer, inertial sensor data from the at least one inertial sensor during execution of the athletic throwing motion by the individual;
analyzing, by the at least one computer, the athletic throwing motion by determining at least one metric from the inertial sensor data; and
generating, by the at least one computer, constructive feedback regarding the athletic throwing motion based on the at least one metric;
wherein determining at least one metric from the inertial sensor data comprises pre-processing raw sensor data to produce predicted sensor data when there is a clipped region in the raw sensor data due to a dynamic range of the at least one inertial sensor being exceeded,
wherein the inertial sensor data comprises inertial data from an inertial sensor mounted to a lower portion of a throwing arm of the individual, and the method further comprises detecting, by the at least one computer, the athletic throwing motion by analyzing the inertial data, and
wherein the inertial data comprises gyroscope data, accelerometer data, and Euler data, and wherein detecting the athletic throwing motion comprises determining that an athletic throwing motion occurred if during a time period (i) there is a data spike in the gyroscope data, (ii) there is a data spike in the accelerometer data, and (iii) there is no data spike in the Euler data.

* * * * *